(12) United States Patent
Behravan et al.

(10) Patent No.: US 10,992,434 B2
(45) Date of Patent: *Apr. 27, 2021

(54) TRANSMISSION IN A GUARD BAND OF A RAT

(71) Applicant: Telefonaktiebolaget LM Ericsson (publ), Stockholm (SE)

(72) Inventors: Ali Behravan, Stockholm (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,038

(22) Filed: Feb. 14, 2020

(65) Prior Publication Data
US 2020/0186307 A1    Jun. 11, 2020

Related U.S. Application Data

(63) Continuation of application No. 16/301,874, filed as application No. PCT/SE2017/050554 on May 23, 2017, now Pat. No. 10,587,376.
(Continued)

(51) Int. Cl.
*H04L 5/00* (2006.01)
*H04L 27/26* (2006.01)
*H04W 16/14* (2009.01)

(52) U.S. Cl.
CPC .......... *H04L 5/0044* (2013.01); *H04L 5/0066* (2013.01); *H04L 27/2602* (2013.01); *H04W 16/14* (2013.01)

(58) Field of Classification Search
None
See application file for complete search history.

(56) References Cited

U.S. PATENT DOCUMENTS 9,071,399 B2 *   6/2015   Drewes .................. H04L 5/0044
9,924,368 B2 *   3/2018   Valliappan ............ H04W 16/14
(Continued)

FOREIGN PATENT DOCUMENTS

RU          2564118 C2       9/2015
WO       2012023891 A1       2/2012
(Continued)

OTHER PUBLICATIONS

Ericsson, "Channel bandwidth for NB-IoT", 3GPP TSG-RAN4#79, Nanjing, China, May 23, 2016, pp. 1-3, R4-163785.
Ericsson, "TP to TR for Unwanted emissions mask RF requirements", 3GPP TSG-RAN WG4 Meeting #78b, San Jose del Cabo, Mexico, Apr. 11, 2016, pp. 1-2, R4-162096.
(Continued)

*Primary Examiner* — Hong S Cho
(74) *Attorney, Agent, or Firm* — Coats & Bennett, PLLC

(57) ABSTRACT

A radio node is configured to transmit, within a guard band of a first radio access technology (RAT), a radio signal according to a second RAT. The radio node determines, based on a channel bandwidth of the first RAT, one or more transmit parameters for transmission of the radio signal according to the second RAT within the guard band of the first RAT, for transmission of the radio signal to comply with emission limits for the first RAT. The one or more transmit parameters include a frequency position of the radio signal within the guard band for the first RAT. The radio node also configures the radio node with the one or more transmit parameters for transmitting the radio signal according to the second RAT within the guard band of the first RAT.

20 Claims, 23 Drawing Sheets

Related U.S. Application Data

(60) Provisional application No. 62/340,337, filed on May 23, 2016, provisional application No. 62/341,582, filed on May 25, 2016.

(56) References Cited

U.S. PATENT DOCUMENTS

| 2014/0286170 | A1* | 9/2014 | Ericson | H04W 16/14 370/235 |
|---|---|---|---|---|
| 2017/0339697 | A1* | 11/2017 | Park | H04L 5/0044 |
| 2018/0255586 | A1* | 9/2018 | Einhaus | H04W 72/0413 |
| 2018/0310213 | A1 | 10/2018 | Kazmi et al. | |

FOREIGN PATENT DOCUMENTS

| WO | 2012173570 A1 | 12/2012 |
|---|---|---|
| WO | 2015036751 A2 | 3/2015 |
| WO | 2015120814 A1 | 8/2015 |

OTHER PUBLICATIONS

Ericsson, "TP to TR for MSR RF requirements", 3GPP TSG-RAN WG4 Meeting #78b,San Jose del Cabo, Mexico, Apr. 11, 2016, pp. 1-2, R4-162095.

3rd Generation Partnership Project, "LTE; Evolved Universal Terrestrial Radio Access (E-UTRA); User Equipment (UE) radio transmission and reception (3GPP TS 36.101 version 13.3.0 Release 13)", Technical Specification, ETSI TS 136 101 V13.3.0, May 1, 2016, pp. 1-931, ETSI.

3rd Generation Partnership Project, "LTE; Evolved Universal Terrestrial Radio Access (E-UTRA); Base Station (BS) radio transmission and reception (3GPP TS 36.104 version 13.3.0 Release 13)", Technical Specification, ETSI TS 136 104 V13.3.0, Apr. 1, 2016, pp. 1-183, Apr. 1, 2016, ETSI.

Huawei, Way forward on BS unwanted emission requirement for NB-IoT, 3GPP TSG-RAN WG4 Meeting #78, St. Julian's, Malta, Feb. 15-19, 2016, R4-160614.

Nokia Networks, et al., Discussion on emission masks for NB-IoT BS, 3GPP TSG-RAN WG4 Meeting #78, St. Julian's, Malta, Feb. 15-19, 2016, R4-160247.

* cited by examiner

Table 5.7.3-1: E-UTRA channel numbers

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0 – 599 | 1920 | 18000 | 18000 – 18599 |
| 2 | 1930 | 600 | 600 – 1199 | 1850 | 18600 | 18600 – 19199 |
| 3 | 1805 | 1200 | 1200 – 1949 | 1710 | 19200 | 19200 – 19949 |
| 4 | 2110 | 1950 | 1950 – 2399 | 1710 | 19950 | 19950 – 20399 |
| 5 | 869 | 2400 | 2400 – 2649 | 824 | 20400 | 20400 – 20649 |
| 6 | 875 | 2650 | 2650 – 2749 | 830 | 20650 | 20650 – 20749 |
| 7 | 2620 | 2750 | 2750 – 3449 | 2500 | 20750 | 20750 – 21449 |
| 8 | 925 | 3450 | 3450 – 3799 | 880 | 21450 | 21450 – 21799 |
| 9 | 1844.9 | 3800 | 3800 – 4149 | 1749.9 | 21800 | 21800 – 22149 |
| 10 | 2110 | 4150 | 4150 – 4749 | 1710 | 22150 | 22150 – 22749 |
| 11 | 1475.9 | 4750 | 4750 – 4949 | 1427.9 | 22750 | 22750 – 22949 |
| 12 | 729 | 5010 | 5010 – 5179 | 699 | 23010 | 23010 – 23179 |
| 13 | 746 | 5180 | 5180 – 5279 | 777 | 23180 | 23180 – 23279 |
| 14 | 758 | 5280 | 5280 – 5379 | 788 | 23280 | 23280 – 23379 |
| ... | | | | | | |
| 17 | 734 | 5730 | 5730 – 5849 | 704 | 23730 | 23730 – 23849 |
| 18 | 860 | 5850 | 5850 – 5999 | 815 | 23850 | 23850 – 23999 |
| 19 | 875 | 6000 | 6000 – 6149 | 830 | 24000 | 24000 – 24149 |
| 20 | 791 | 6150 | 6150 – 6449 | 832 | 24150 | 24150 – 24449 |
| 21 | 1495.9 | 6450 | 6450 – 6599 | 1447.9 | 24450 | 24450 – 24599 |
| 22 | 3510 | 6600 | 6600 – 7399 | 3410 | 24600 | 24600 – 25399 |
| 23 | 2180 | 7500 | 7500 – 7699 | 2000 | 25500 | 25500 – 25699 |
| 24 | 1525 | 7700 | 7700 – 8039 | 1626.5 | 25700 | 25700 – 26039 |
| 25 | 1930 | 8040 | 8040 – 8689 | 1850 | 26040 | 26040 – 26689 |
| 26 | 859 | 8690 | 8690 – 9039 | 814 | 26690 | 26690 – 27039 |
| 27 | 852 | 9040 | 9040 – 9209 | 807 | 27040 | 27040 – 27209 |
| 28 | 758 | 9210 | 9210 – 9659 | 703 | 27210 | 27210 – 27659 |
| 29[a] | 717 | 9660 | 9660 – 9769 | N/A | | |
| 30 | 2350 | 9770 | 9770 – 9869 | 2305 | 27660 | 27660 – 27759 |

FIG. 1B (PRIOR ART)

Table 5.7.3-1: E-UTRA channel numbers (continued)

| 31 | 462.5 | 9870 | 9870 – 9919 | 452.5 | 27760 | 27760 – 27809 |
|---|---|---|---|---|---|---|
| 32² | 1452 | 9920 | 9920 – 10359 | | N/A | |
| 33 | 1900 | 36000 | 36000 – 36199 | 1900 | 36000 | 36000 – 36199 |
| 34 | 2010 | 36200 | 36200 – 36349 | 2010 | 36200 | 36200 – 36349 |
| 35 | 1850 | 36350 | 36350 – 36949 | 1850 | 36350 | 36350 – 36949 |
| 36 | 1930 | 36950 | 36950 – 37549 | 1930 | 36950 | 36950 – 37549 |
| 37 | 1910 | 37550 | 37550 – 37749 | 1910 | 37550 | 37550 – 37749 |
| 38 | 2570 | 37750 | 37750 – 38249 | 2570 | 37750 | 37750 – 38249 |
| 39 | 1880 | 38250 | 38250 – 38649 | 1880 | 38250 | 38250 – 38649 |
| 40 | 2300 | 38650 | 38650 – 39649 | 2300 | 38650 | 38650 – 39649 |
| 41 | 2496 | 39650 | 39650 – 41589 | 2496 | 39650 | 39650 – 41589 |
| 42 | 3400 | 41590 | 41590 – 43589 | 3400 | 41590 | 41590 – 43589 |
| 43 | 3600 | 43590 | 43590 – 45589 | 3600 | 43590 | 43590 – 45589 |
| 44 | 703 | 45590 | 45590 – 46589 | 703 | 45590 | 45590 – 46589 |
| 45 | 1447 | 46590 | 46590 – 46789 | 1447 | 46590 | 46590 – 46789 |
| 46² | 5150 | 46790 | 46790 – 54539 | 5150 | 46790 | 46790 – 54539 |
| 47 | 5855 | 54540 | 54540 – 55239 | 5855 | 54540 | 54540 – 55239 |
| 48 | 3550 | 55240 | 55240 – 56739 | 3550 | 55240 | 55240 – 56739 |
| … | | | | | | |
| 64 | | | Reserved | | | |
| 65 | 2110 | 65536 | 65536 – 66435 | 1920 | 131072 | 131072 – 131971 |
| 66³ | 2110 | 66436 | 66436 – 67335 | 1710 | 131972 | 131972 – 132671 |
| 67² | 738 | 67336 | 67336 – 67535 | | N/A | |
| 68 | 753 | 67536 | 67536 – 67835 | 698 | 132672 | 132672 – 132971 |
| 69² | 2570 | 67836 | 67836 – 68335 | | N/A | |
| 70⁵ | 1995 | 68336 | 68336 – 68585 | 1695 | 132972 | 132972 – 133121 |

FIG. 1C (PRIOR ART)

| Δf_OOB (MHz) | Spectrum emission limit (dBm)/ Channel bandwidth | | | | | | | Measurement bandwidth |
|---|---|---|---|---|---|---|---|---|
| | 1.4 MHz | 3.0 MHz | 5 MHz | 10 MHz | 15 MHz | 20 MHz | | |
| ± 0-1 | -10 | -13 | -15 | -18 | -20 | -21 | | 30 kHz |
| ± 1-2.5 | -10 | -10 | -10 | -10 | -10 | -10 | | 1 MHz |
| ± 2.5-2.8 | -25 | -10 | -10 | -10 | -10 | -10 | | 1 MHz |
| ± 2.8-5 | | -10 | -10 | -10 | -10 | -10 | | 1 MHz |
| ± 5-6 | | -25 | -13 | -13 | -13 | -13 | | 1 MHz |
| ± 6-10 | | | -25 | -13 | -13 | -13 | | 1 MHz |
| ± 10-15 | | | | -25 | -13 | -13 | | 1 MHz |
| ± 15-20 | | | | | -25 | -13 | | 1 MHz |
| ± 20-25 | | | | | | -25 | | 1 MHz |

FIG. 2 (PRIOR ART)

| System bandwidth [MHz] | PRBs in system bandwidth | Guard band PRB center frequency offset [kHz] | Offset to 100 kHz grid | Guard sub-carriers needed to be with ±7.5 kHz of 100 kHz | Guard band PRB center frequency offset when including guard sub-carriers [kHz] |
|---|---|---|---|---|---|
| 3 | 15 | 1447.5 | 52.5 | 3 | 1492.5 |
| 5 | 25 | 2347.5 | 52.5 | 3 | 2392.5 |
| 10 | 50 | 4597.5 | 2.5 | 0 | 4597.5 |
| 15 | 75 | 6847.5 | 52.5 | 3 | 6892.5 |
| 20 | 100 | 9097.5 | 2.5 | 0 | 9097.5 |

FIG. 5 (PRIOR ART)

| Δf$_{OOB}$ (kHz) | Emission limit (dBm) | Measurement bandwidth |
|---|---|---|
| ± 0 | 26 | 30 kHz |
| ± 100 | -5 | 30 kHz |
| ± 150 | -8 | 30 kHz |
| ± 300 | -29 | 30 kHz |
| ± 500-1700 | -35 | 30 kHz |

DETERMINE ONE OR MORE TRANSMIT PARAMETERS FOR TRANSMISSION OF A RADIO SIGNAL ACCORDING TO A SECOND RAT, TO COMPLY WITH EMISSION LIMITS FOR A FIRST RAT ⎯ 801

CONFIGURE THE RADIO NODE WITH THE ONE OR MORE TRANSMIT PARAMETERS FOR TRANSMITTING THE RADIO SIGNAL WITHIN THE GUARD BAND OF THE FIRST RAT ⎯ 803

| Channel BW (MHz) | Offset frequency to the edge of channel BW |
|---|---|
| 1.4 | TBD |
| 3 | TBD |
| 5 | TBD |
| 10 | TBD |
| 15 | TBD |
| 20 | TBD |

FIG. 9B

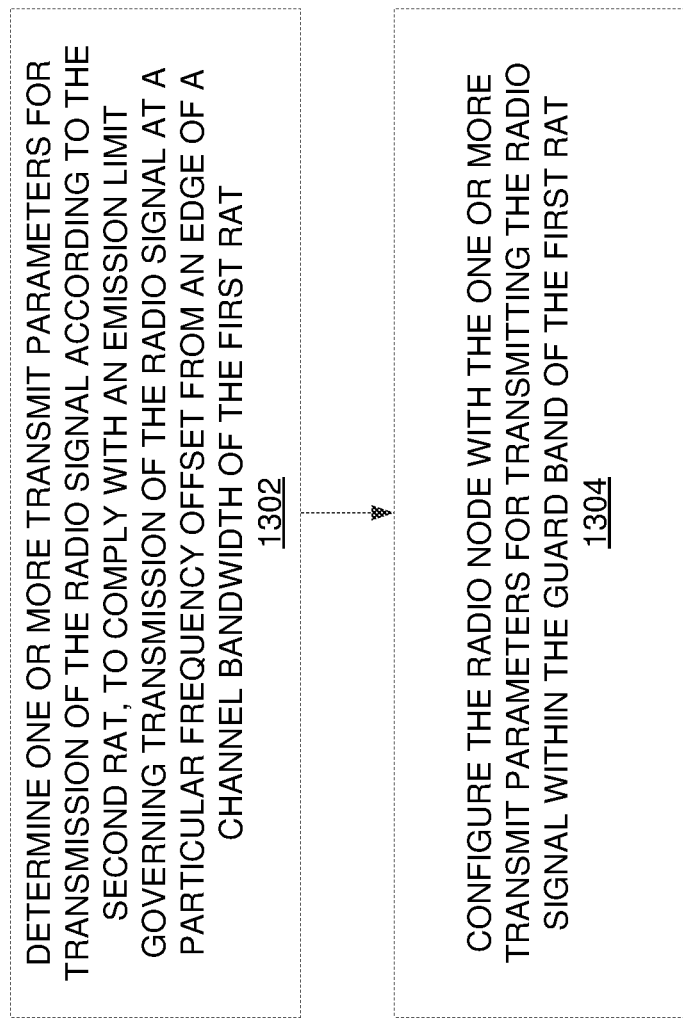

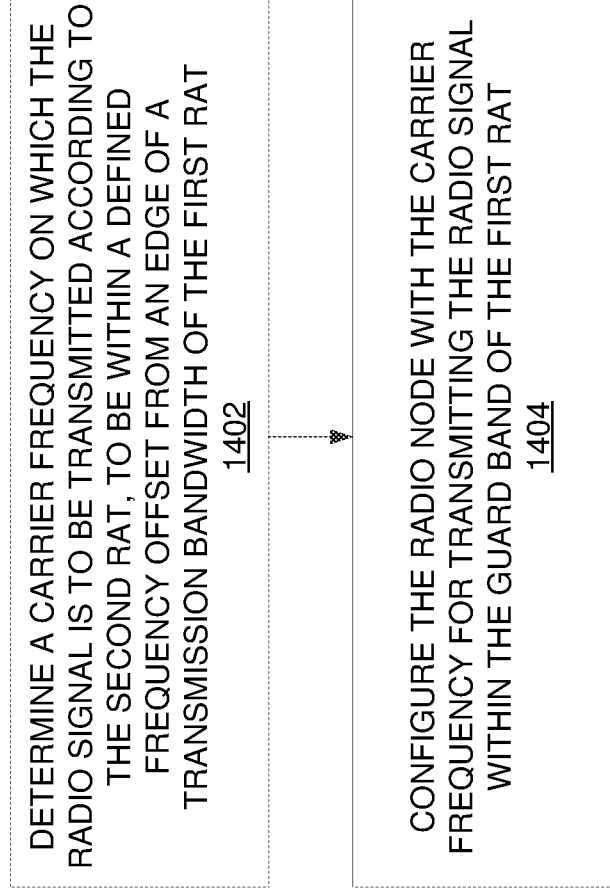

TRANSMISSION IN A GUARD BAND OF A RAT

RELATED APPLICATIONS

The present application is a continuation of U.S. patent application Ser. No. 16/301,874, filed Nov. 15, 2018, which is a national stage application of PCT/SE2017/050554, which was filed on May 23, 2017, and claims benefit of U.S. Provisional Patent Application Ser. No. 62/340,337 filed May 23, 2016 and U.S. Provisional Patent Application Ser. No. 62/341,582 filed May 25, 2016, the entire contents of each of which are incorporated herein by reference.

TECHNICAL FIELD

The present disclosure relates generally to the field of communications, and in particular to transmission in a guard band of a radio access technology.

BACKGROUND

E-UTRA Downlink and Uplink Carrier Frequencies

Evolved universal terrestrial radio access (E-UTRA) uses orthogonal frequency division multiplexing (OFDM) in downlink (DL) transmission and single carrier frequency division multiple access (SC-FDMA) in the uplink (UL). The center frequency of the DL bandwidth and the UL bandwidth is called carrier frequency. The subcarrier spacing for both DL and the UL is equal to 15 kHz.

In order to limit the magnitude of the signal which causes inefficiency in the digital to analog (D/A) and analog to digital (A/D) converters, the direct current (DC) subcarrier in the DL is usually not used for transmission and is set to zero. In the baseband signal this subcarrier corresponds to frequency zero, which means a DC component in the baseband signal.

To avoid the similar problem in the UL, the subcarriers are shifter by 7.5 kHz to avoid transmission on the center frequency and also to save the number of subcarriers. FIG. 1A for example illustrates subcarrier arrangements in the DL and UL in the legacy E-UTRA standard.

The carrier frequency in the uplink and downlink is designated by the E-UTRA Absolute Radio Frequency Channel Number (EARFCN) in the range 0-262143. The relation between EARFCN and the carrier frequency in MHz for the downlink is given by the following equation, where $F_{DL\_low}$ and $N_{Offs-DL}$ are given in Table 5.7.3-1 of 3GPP technical specifications 36.101 and 36.104 (as shown in FIGS. 1B-1C), and $N_{DL}$ is the downlink EARFCN.

$$F_{DL}=F_{DL\_low}+0.1(N_{DL}-N_{Offs-DL})$$

The relation between EARFCN and the carrier frequency in MHz for the uplink is given by the following equation where $F_{UL\_low}$ and $N_{Offs-UL}$ are given in Table 5.7.3-1 of 3GPP technical specifications 36.101 and 36.104, and $N_{u}s$ is the uplink EARFCN.

$$F_{UL}=F_{UL\_low}+0.1(N_{UL}-N_{Offs-UL})$$

E-UTRA Out of Band Emission

The out of band emissions are unwanted emissions immediately outside the assigned channel bandwidth resulting from the modulation process and non-linearity in the transmitter but excluding spurious emissions. This out of band emission limit is specified in terms of a spectrum emission mask and an Adjacent Channel Leakage power Ratio (ACLR).

The spectrum emission mask applies to frequencies ($\Delta f_{OOB}$) starting from the ± edge of the assigned E-UTRA channel bandwidth. As an example, for E-UTRA user equipment (UE) the emission should not exceed the levels specified in Table 1 shown in FIG. 2 for the specified channel bandwidth.

Narrow Band Internet of Things (NB-IoT)

In GERAN #62, a study item on "Cellular System Support for Ultra Low Complexity and Low Throughput Internet of Things" was approved. The aim was to study both the possibility of evolving current Global System for Mobile communications (GSM) Enhanced Data Rates for GSM Evolution (EDGE) Radio Access Network (GERAN) system and the design of a new access system towards low complexity and low throughput radio access technology to address the requirements of cellular internet of things. The objectives of the study were: improved indoor coverage, support for massive number of low throughput devices, low delay sensitivity, ultra-low device cost, low device power consumption and (optimized) network architecture. As per the PCG #34 decisions, it was agreed to move the normative phase of a single "clean-slate solution" to 3GPP Long Term Evolution (LTE). This feature is called Narrowband Internet of Things (NB-IOT).

3GPP LTE represents the project within the third generation partnership project, with an aim to improve the UMTS (Universal Mobile Telecommunications Service) standard. 3GPP LTE radio interface offers high peak data rates, low delays and increase in spectral efficiencies. LTE ecosystem supports both Frequency division duplex (FDD) and Time division duplex (TDD). This enables the operators to exploit both the paired and unpaired spectrum since LTE has flexibility in bandwidth as it supports 6 bandwidths 1.4 MHz, 3 MHz, 5 MHz, 10 MHz, 15 MHz and 20 MHz.

The objective of this new work item on NB-IOT is to specify a radio access for cellular internet of things, based to a great extent on a non-backward-compatible variant of E-UTRA, that addresses improved indoor coverage, support for massive number of low throughput devices, low delay sensitivity, ultra low device cost, low device power consumption and (optimized) network architecture.

NB-IoT should support 3 different modes of operation: (1) 'Stand-alone operation' utilizing for example the spectrum currently being used by GERAN systems as a replacement of one or more GSM carriers. In principle it operates on any carrier frequency which is neither within the carrier of another system not within the guard band of another system's operating carrier. The other system can be another NB-IOT operation or any other RAT e.g. LTE. (2) 'Guard band operation' utilizing the unused resource blocks within a LTE carrier's guard-band. The term guard band may also interchangeably be called guard bandwidth. (3) '1n-band operation' utilizing resource blocks within a normal LTE carrier. The in-band operation may also interchangeably be called in-bandwidth operation.

In NB-IoT, the downlink transmission is based on OFDM with 15 kHz subcarrier spacing for all the scenarios: stand-alone, guard-band, and in-band. For UL transmission, both multi-tone transmissions based on SC-FDMA, and single tone transmission is supported. A multi-tone transmission is based on SC-FDMA with 15 kHz UL subcarrier spacing. For the single tone transmissions, two numerologies can be configurable by the network 3.75 kHz and 15 kHz. A cyclic prefix is inserted.

This means that the physical waveforms for NB-IoT in downlink and also partly in uplink is similar to legacy LTE.

In the downlink design, NB-IoT supports both master information broadcast and system information broadcast which are carried by different physical channels. For in-band operation, it is possible for NB-IoT UE to decode the narrowband physical broadcast channel (NB-PBCH) without knowing the legacy physical resource block (PRB) index. NB-IoT supports both downlink physical control channel (NB-PDCCH) and downlink physical shared channel (PDSCH). The operation mode of NB-IoT must be indicated to the UE, and currently 3GPP is considering indication by means of NB-SSS (secondary synchronization signal), NB-MIB (master information block) or perhaps other downlink signals.

NB-IoT supports physical broadcast channel (NPBCH), physical downlink control channel (NPDCCH), physical downlink shared channel (PDSCH), physical uplink control channel (NPUCCH), physical uplink shared channel (NPUSCH), physical random access channel (NPRACH).

The general design principle of NB-IoT follows that of legacy LTE. Downlink synchronization signal consists of primary synchronization signal (NPSS) and secondary synchronization signal (NSSS). The periodicity of NPSS transmission is 10 ms.

Also cell specific reference symbols (NRS) are defined for NB-IoT. FIG. 3 shows the NRS reference symbols for different operation modes; namely, for NB-IoT in-band and guardband/stand-alone scenarios.

Channel Arrangement in NB-IoT

The channel raster for all operation modes of NB-IoT is 100 kHz. However, the carrier frequency of an NB-IoT channel may be at an offset compared to the 100 kHz grid. For example, as shown in FIG. 4, in case of guard-band operation in 10 MHz system bandwidth the first PRBs adjacent to the PRBs 0-49 within the LTE transmission bandwidth are centered at 4597.5 kHz and −4597.5 kHz.

FIG. 5 shows a table with the center frequency offset for the adjacent PRB in the higher frequency guard band for different LTE system bandwidths. The offset is the same to the adjacent PRB in the lower guard band. The 1.4 MHz system bandwidth has been excluded since guard band operation is not seen as feasible. It can be seen that the center frequency of the guard band PRB is at multiples of 2.5 kHz off the 100 kHz frequency raster. It has been agreed in 3GPP that the DL and UL center frequency of the NB-IoT can be described as $$F_{DL}=F_{DL\_low}+0.1(N_{DL}-N_{Offs-DL})+0.0025*(2M_{DL}+1) \quad (1)$$

$$F_{UL}=F_{UL\_low}+0.1(N_{UL}-N_{Offs-UL})+0.0025*(2M_{UL}) \quad (2)$$

Where $N_{DL}$ and $N_{UL}$ are E-UTRA Absolute Radio Frequency Channel Number (EARFCN). $M_{DL}$ and $M_{UL}$ are the offset of NB-IoT channel to the raster and $M_{DL} \in \{-10,-9,-8,-7,-6,-5,-4,-3,-2,-1,-0.5,0,1,2,3,4,5,6,7,8,9\}$, $M_{UL} \in \{-10,-9,-8,-7,-6,-5,-4,-3,-2,-1,0,1,2,3,4,5,6,7,8,9\}$.

It has also been agreed that the UL frequency carrier is to be determined as follows for all deployment scenarios. For initial access, the NB-IoT DL/UL frequency separation is configured by higher layers (SIBx) and is cell-specific. After the initial random access procedure success, there can also be a UE specific configuration for the NB-IoT DL/UL frequency separation.

This means that based on the network signaling, the spacing between the TX and RX may be fixed or may be variable.

NB-IoT Out of Band Emission

The spectrum emission mask of NB-IoT UE applies to frequencies ($\Delta f_{OOB}$) starting from the ± edge of the assigned NB-IoT UE channel bandwidth. The power of any category NB1 UE emission shall not exceed the levels specified in the table shown in FIG. 6.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

One or more embodiments herein include a method for configuring a radio node to transmit, within a guard band of a first radio access technology (RAT), a radio signal according to a second RAT. The method comprises determining, based on a channel bandwidth of the first RAT, one or more transmit parameters for transmission of the radio signal according to the second RAT within the guard band of the first RAT, for transmission of the radio signal to comply with emission limits for the first RAT. The one or more transmit parameters include a frequency position of the radio signal within the guard band for the first RAT. The method also comprises configuring the radio node with the one or more transmit parameters for transmitting the radio signal according to the second RAT within the guard band of the first RAT.

In some embodiments, the one or more transmit parameters include a carrier frequency on which the radio signal is to be transmitted according to the second RAT. In this case, determining the one or more transmit parameters may comprise determining the carrier frequency based on an edge frequency defining an edge of the channel bandwidth of the first RAT and a defined frequency offset with respect to that edge frequency. In some embodiments, the method may further comprise determining the defined frequency offset based on the channel bandwidth of the first RAT, with defined frequency offsets defined for different possible channel bandwidths of the first RAT. Alternatively or additionally, the defined frequency offset may be specified based on emission requirements for the first RAT.

In some embodiments, determining the one or more transmit parameters may comprise determining the frequency position of the radio signal such that a spectral emission mask governing transmission of the radio signal according to the second RAT is within a spectral emission mask governing the first RAT.

In some embodiments, the emission limits for the second RAT are specified as nominal emission limits applicable for transmitting a radio signal according to the second RAT irrespective of whether the radio signal is transmitted in the guard band for the first RAT and additional emission limits applicable in addition to the nominal emission limits for transmitting a radio signal according to the second RAT in the guard band for the first RAT. In this case, the additional emission limits may depend on a frequency offset of the radio signal from an edge of a channel bandwidth for the first RAT, and the additional emission limits may be enforced when the frequency offset is smaller than a defined threshold and are not enforced when the frequency offset is greater than the defined threshold. In some of these embodiments, the defined threshold depends on a size of the channel bandwidth for the first RAT.

In some embodiments, a spectrum emission mask for the second RAT applies to frequencies starting from an edge of a channel bandwidth of the second RAT. In this case, determining the one or more transmit parameters may comprise determining the frequency position based on requirements specified for the spectrum emission mask for the second RAT regarding an offset frequency from an edge of the channel bandwidth of the first RAT. In some of these embodiments, the offset frequency depends on a size of the channel bandwidth of the first RAT. Alternatively, determining the one or more transmit parameters may comprise determining the frequency position based on a table that specifies respective offset frequencies required for different possible sizes of the channel bandwidth of the first RAT.

In some embodiments, determining the one or more transmit parameters may comprise determining the frequency position based on a requirement of at least a certain frequency offset between an edge of the channel bandwidth of the first RAT and an edge of a channel bandwidth of the second RAT. In some of these embodiments, the certain frequency offset required depends on a size of the channel bandwidth of the first RAT.

In some embodiments, determining the one or more transmit parameters may comprise determining the frequency position based on a requirement regarding an offset frequency from an edge of the channel bandwidth of the first RAT.

In some embodiments, determining the one or more transmit parameters may comprise determining the one or more transmit parameters for transmission of the radio signal to comply with emission limits for both the first and second RATs.

In some embodiments, the method is performed by a base station, and wherein said configuring comprises indicating the one or more transmit parameters to the radio node. Alternatively, the method may be performed by the radio node and may further comprise transmitting the radio signal as configured with the one or more transmit parameters.

In any of these embodiments, the radio node may be a user equipment.

Embodiments also include corresponding apparatus, computer programs, carriers, and non-transitory computer readable mediums.

For example, some embodiments include a base station for configuring a radio node to transmit, within a guard band for a first radio access technology (RAT), a radio signal according to a second RAT. The base station may be configured to determine, based on a channel bandwidth of the first RAT, one or more transmit parameters for transmission of the radio signal according to the second RAT, for transmission of the radio signal to comply with emission limits for the first RAT. In some embodiments, the one or more transmit parameters include a frequency position of the radio signal within the guard band of the first RAT. The base station may also be configured to configure the radio node with the one or more transmit parameters for transmitting the radio signal according to the second RAT within the guard band of the first RAT. The base station may for example do so by indicating the one or more transmit parameters to the radio node.

Embodiments also include a user equipment for transmitting, within a guard band for a first radio access technology (RAT), a radio signal according to a second RAT. The user equipment is configured to determine, based on a channel bandwidth of the first RAT, one or more transmit parameters for transmission of the radio signal according to the second RAT, for transmission of the radio signal to comply with emission limits for the first RAT. The one or more transmit parameters may include a frequency position of the radio signal within the guard band of the first RAT. The user equipment is also configured to transmit the radio signal with the one or more transmit parameters according to the second RAT within the guard band of the first RAT.

This section presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 1B-1C is a table of E-UTRA channel numbers.

FIG. 2 is a block diagram illustrating an E-UTRA spectrum emission mask.

FIG. 5 is a block diagram illustrating center frequency offset of the guard band PRB for different LTE system bandwidths.

FIG. 6 is a block diagram illustrating NB-IoT UE spectrum emission mask.

FIG. 9B is a table illustrating respective offset frequencies for different sizes of an LTE channel bandwidth according to some embodiments.

FIG. 13 is a logic flow diagram of a method performed by a configuring node according to other embodiments.

FIG. 14 is a logic flow diagram of a method performed by a configuring node according to yet other embodiments.

DETAILED DESCRIPTION

Figure 1A:
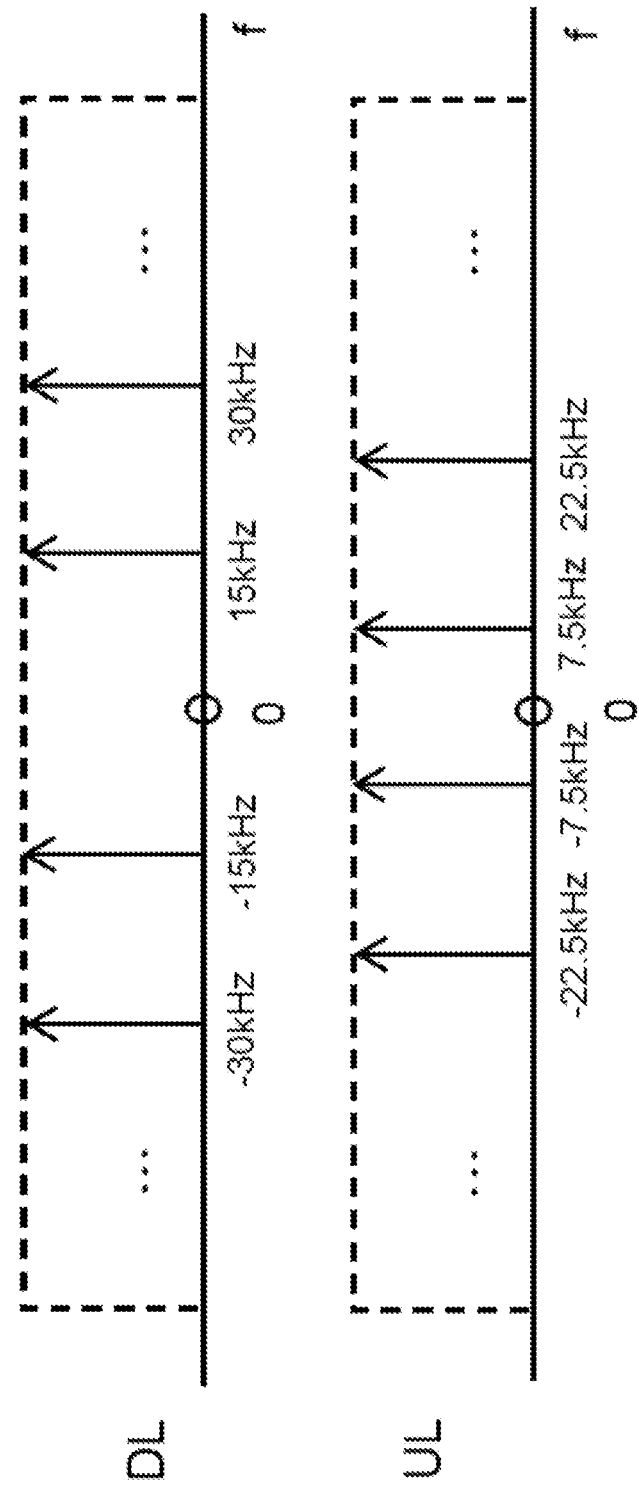
FIG. 1A is a block diagram illustrating a subcarrier arrangement in an E-UTRA system.
Figure 3:
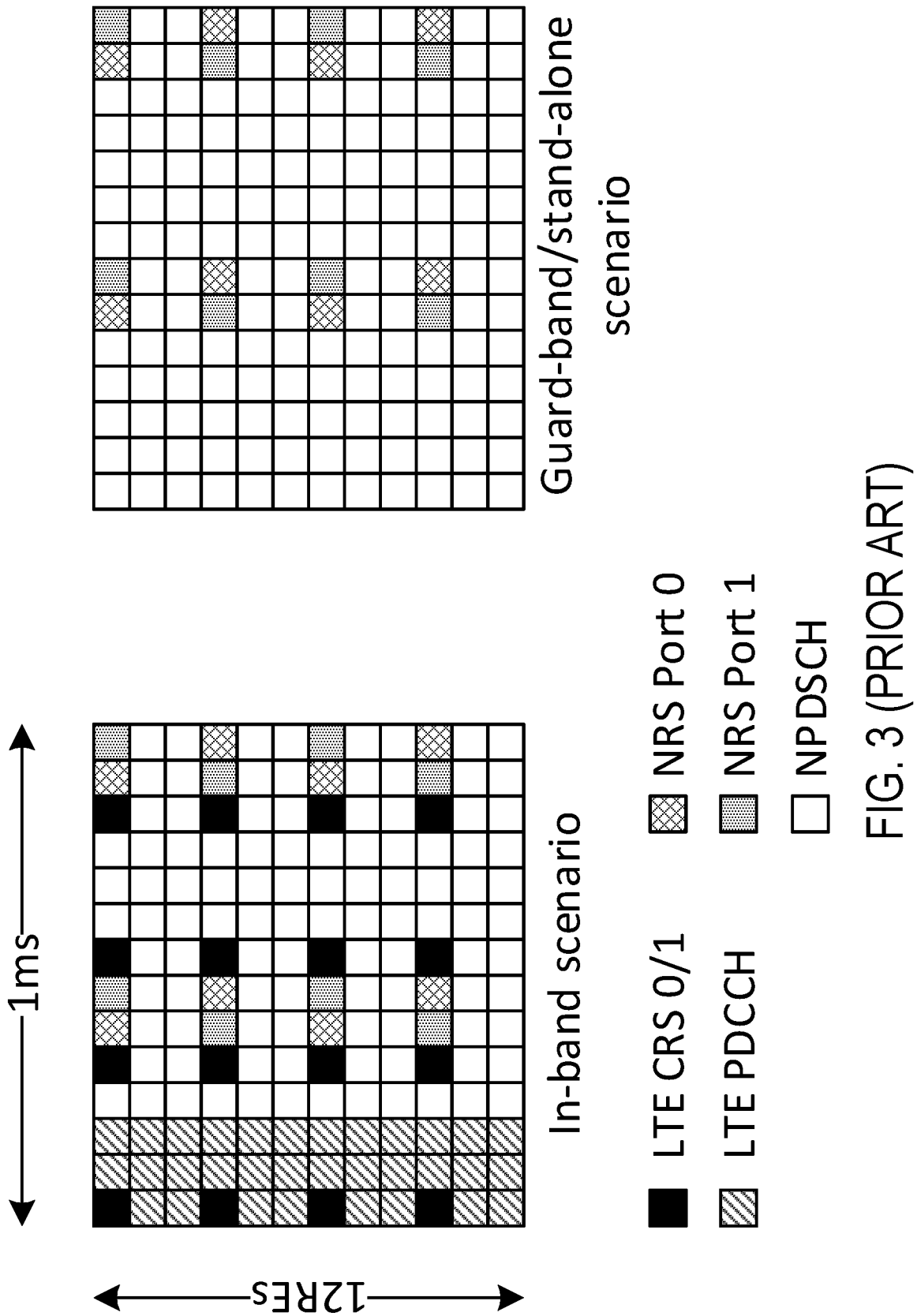
FIG. 3 is a block diagram illustrating cell-specific reference signals for NB-IoT for an in-band scenario and a guard band/standalone scenario.
Figure 4:
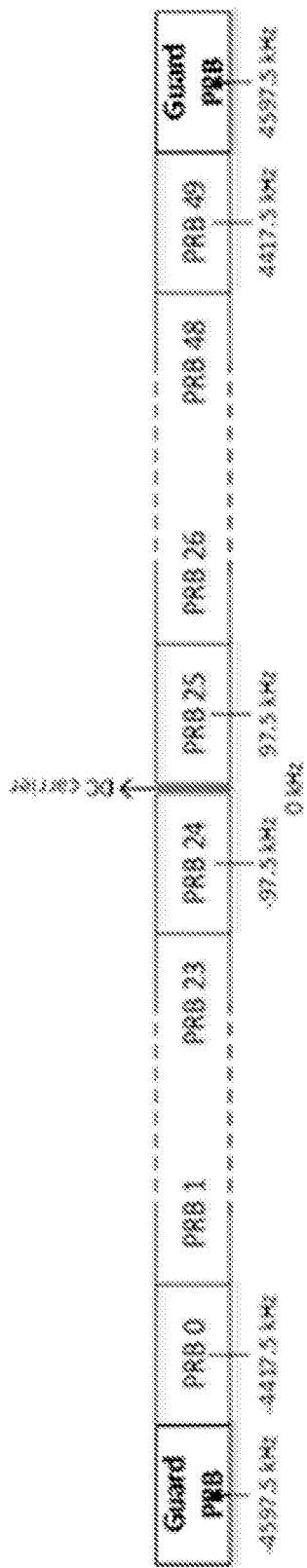
FIG. 4 is a block diagram illustrating adjacent LTE PRB for guard band operation in 10 MHz LTE system bandwidth.
Figure 7:
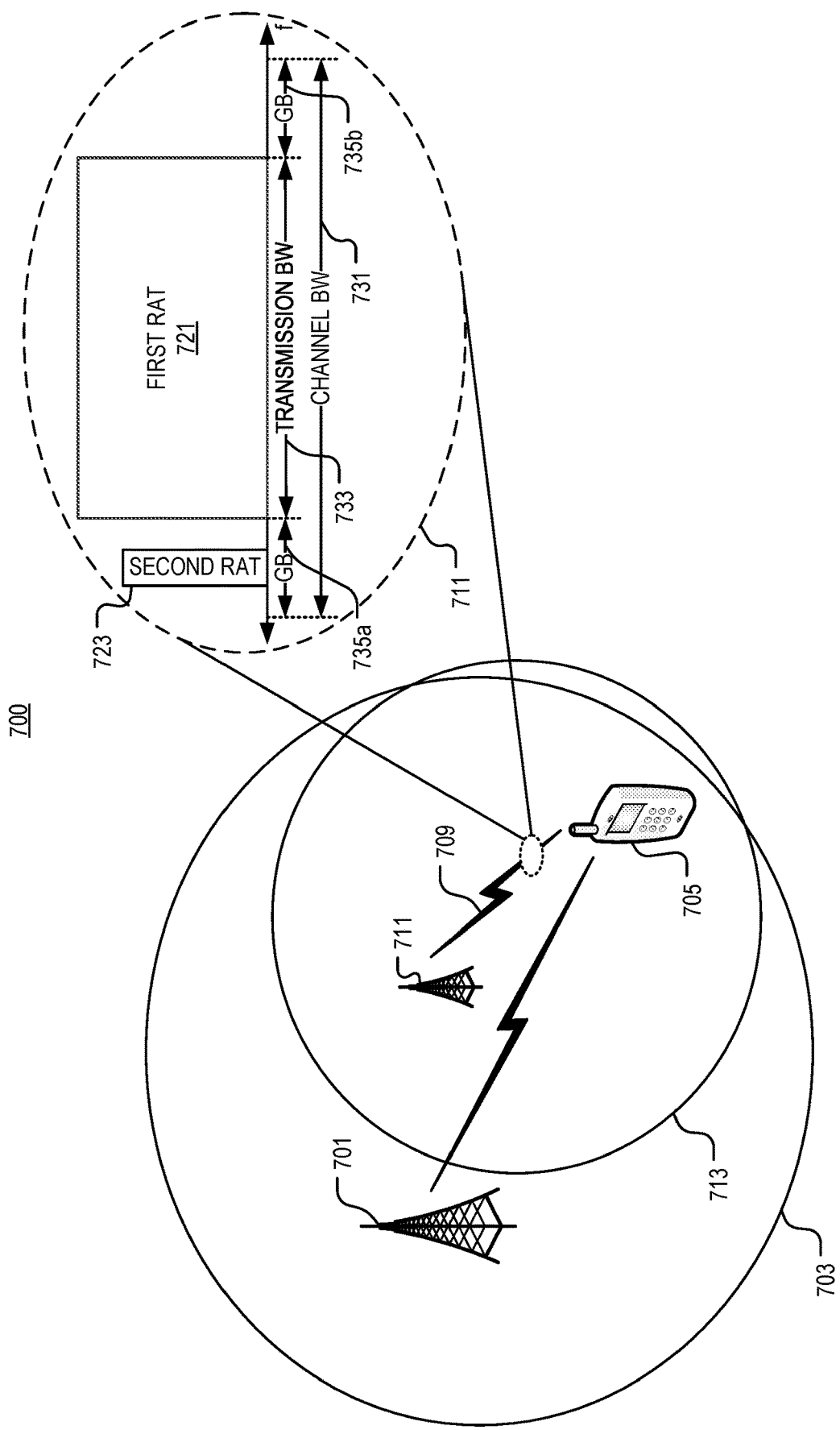
FIG. 7 is a block diagram illustrating one embodiment of a system for configuring transmission in a guard band of a radio access technology in accordance with various aspects as described herein.

FIG. 7 illustrates one embodiment of a system 700 for configuring transmission in a guard band of a radio access technology in accordance with various aspects as described herein. A first wireless communication system (e.g., wideband LTE) may have a channel bandwidth 731 that includes a transmission bandwidth 733 and one or more guard bands 735a-b. In one example, the first wireless communication system may be one or more wideband communication systems such as LTE, LTE-NX, UMTS, GSM, or the like. The first system may operate on frequency resources in the transmission bandwidth 733 using a first radio access technology (RAT) (e.g., LTE, LTE-NX, UMTS, GSM, or the like), as referenced by 721. In one example, a frequency resource may be a range of contiguous frequencies, a physical resource block (PRB), or the like. In another example, a frequency resource may be a single subcarrier, multiple contiguous subcarriers, or the like. A second wireless communication system (e.g., a Narrowband IoT system) may operate on one or more frequency resources in the channel bandwidth 731 of the first system, outside such bandwidth, or both, using a second RAT (e.g., NB-IoT). In one example, the second wireless communication system may be one more narrowband communication systems such as NB-IoT.

In one embodiment, the first system may include a first network node 701 (e.g., a base station) with a coverage area 703. The first network node 701 may be configured to support frequency resources in the transmission bandwidth 733 using the first RAT. Further, the first network node 701 may serve a wireless device (e.g., user equipment, UE) 705 on the frequency resources in the transmission bandwidth 733 using the first RAT. The second system may include a second network node 711 (e.g., base station) with a coverage area 713. The second network node 711 may be configured to support one or more frequency resources in the channel bandwidth 731 of the first system, outside such bandwidth, or both, using the second RAT. In one example, the second network node 711 may be configured to support frequency resources in the guard band 735a of the first system using the second RAT, e.g., where the guard band is the range of frequencies between the edges of the transmission bandwidth and the channel bandwidth. The second network node 711 may also serve the wireless device (e.g., UE) 705 on the one or more frequency resources using the second RAT. For example, the second network node 711 may serve the wireless device 705 on one or more frequency resources in the guard band 735a of the first system using the second RAT, as referenced by 723. Each of the first and second network nodes 701 and 711, respectively, may be a base station, an access point, a wireless router, or the like. Further, the first network node 701 and the second network node 711 may be the same network node or different network nodes.

In another embodiment, the second network node 711 may configure the wireless device 705 to transmit a radio signal 709, within the guard band 735a for the first RAT, according to the second RAT. Further, the second network node 711 may determine one or more transmit parameters for transmission of the radio signal 709 according to the second RAT, to comply with emission limits for the first RAT. The one or more transmit parameters may include a frequency position of the radio signal 709 within the guard band of the first RAT. Alternatively or additionally, the one or more transmit parameters may include a signal level of a radio signal, a maximum signal level of a radio signal, a frequency allocation of subcarriers for the second system, a transport format (e.g., a modulation scheme, a coding scheme, a transport block size, or the like), the like, or any combination thereof. Also, the second network node 711 may configure the wireless device 705 with the one or more transmit parameters for transmitting the radio signal 709 within the guard band 735a of the first RAT. The second network node 711 may for instance indicate the one or more transmit parameters to the wireless device 705, e.g., via system information, control signaling, etc.

In another embodiment, the wireless device 705 may configure itself to transmit the radio signal 709, within the guard band 735a for the first RAT, according to the second RAT. In particular, the wireless device 705 may determine one or more transmit parameters for transmission of the radio signal 709 according to the second RAT, to comply with emission limits for the first RAT. Also, the wireless device 705 may configure itself with the one or more transmit parameters for transmitting the radio signal 709 within the guard band 735a of the first RAT.

Although illustrated above in terms of configuring a wireless device 705 to transmit a radio signal 709, embodiments herein also include configuring any other sort of radio node (e.g., a base station) to transmit a radio signal. In general, therefore, embodiments herein include a so-called configuring node that configures a radio node to transmit a radio signal according to the second RAT within a guard band of the first RAT, as described above. The configuring node may be the radio node itself, a radio node to which the radio signal is to be transmitted, or some other node.

Figure 8:
FIG. 8 is a logic flow diagram of a method performed by a configuring node according to some embodiments.

Accordingly, FIG. 8 generally shows a method performed by any so-called configuring node for configuring a radio node to transmit a radio signal according to the second RAT within a guard band of the first RAT. As shown, the method includes determining one or more transmit parameters for transmission of a radio signal according to the second RAT, to comply with emission limits for the first RAT; that is, for the transmission of the radio signal to comply with emission limits for the first RAT (Block 801). In some embodiments, the radio node also determines the one or more transmit parameters for the transmission to comply with emission limits for the second RAT, i.e., so that the transmission complies with emission limits for both the first and second RATs. Regardless, the method also includes configuring the radio node with the one or more transmit parameters for transmitting the radio signal according to the second RAT within the guard band of the first RAT (Block 803). Where the configuring node is a base station, for example, such configuring may involve indicating the one or more transmit parameters to the radio node, whereas where the configuring node is the radio node itself, such configuring may involve controlling one or more settings or parameters of the radio node that govern transmission of the radio signal.

According to some embodiments, the one or more transmit parameters include a frequency position of the radio signal within the guard band of the first RAT. The frequency position may be represented by or governed by a carrier frequency (e.g., center frequency) on which the radio signal is to be transmitted according to the second RAT. This carrier frequency may in turn be represented by a channel number. Regardless of how the frequency position is represented or governed, some embodiments determine that frequency position based on certain restrictions that are specified on the frequency position. These restrictions may ensure or guarantee that transmission of the radio signal meets emission limits for the first RAT, e.g., that transmission of the radio signal according to the second RAT does not cause more emissions than those allowed for the first RAT.

In these and other embodiments, determining the one or more transmit parameters (e.g., frequency position) may be based on a channel bandwidth of the first RAT. Some embodiments, for example, determine the frequency position based on a requirement regarding an offset frequency from an edge of the channel bandwidth of the first RAT. In one such embodiment, the frequency position is determined based on a requirement of at least a certain frequency offset between an edge of the channel bandwidth of the first RAT and an edge of a channel bandwidth of the second RAT. Where the frequency position is represented by the carrier frequency, for instance, embodiments may determine the carrier frequency based on an edge frequency defining an edge of the channel bandwidth of the first RAT and a defined frequency offset with respect to that edge frequency.

Regardless of how the frequency position is represented, the certain frequency offset required may depend on a size of the channel bandwidth of the first RAT, e.g., with larger offsets required for larger first RAT channel bandwidth sizes. For example, respective frequency offsets may be defined for different possible channel bandwidths of the first RAT. In particular, the frequency position may be determined based on a table that specifies respective offset frequencies required for different possible sizes of the channel bandwidth of the first RAT.

No matter how defined or determined, though, the frequency offset in some embodiments guarantees that transmission of the radio signal meets emission limits for the first RAT, e.g., at least assuming that transmission of the radio signal meets emission limits for the second RAT. Indeed, in some embodiments, the frequency offset is defined such that as long as transmission of the radio signal meets emission limits for the second RAT, transmission of the radio signal will be guaranteed to also meet emission limits for the first RAT, e.g., due to the frequency offset to the channel bandwidth edge of the first RAT. In this sense, then, the frequency offset may be specified based on emission requirements for the first RAT. Accordingly, some embodiments effectively determine the frequency position of the radio signal such that the spectral emission mask governing transmission of the radio signal according to the second RAT is or remains within the spectral emission mask governing the first RAT. This may enhance the second RAT's performance in the guard band of the first RAT and/or reduce/avoid interference to other systems operating in carrier frequencies adjacent to the carrier frequency of the first RAT.

Note therefore that the above embodiments may be specified in terms of the relation between spectral emission masks or spectral emission requirements, since those requirements are effectively defined with respect to the channel bandwidth edge. For example, in some embodiments, a spectrum emission mask for the second RAT applies to frequencies starting from an edge of the channel bandwidth of the second RAT, and the frequency position is determined based on requirements specified for the spectrum emission mask for the second RAT regarding an offset frequency from an edge of the channel bandwidth of the first RAT. Because the spectrum emission mask defines the channel bandwidth edge for the second RAT, this effectively means that there is a certain frequency offset between the edge of the channel bandwidth of the second RAT and the edge of the channel bandwidth of the first RAT. Again, this frequency offset may depend on a size of the channel bandwidth of the first RAT.

From another perspective, some embodiments may be specified in terms of emission limits for the first RAT applying for certain frequencies. The emission limits for the first RAT may for instance apply for any frequency that has (no more than) a certain offset between that frequency and an edge of the channel bandwidth of the second RAT. Because the frequencies to which the emission limits for the first RAT apply to start at the edge of the channel bandwidth of the first RAT, this effectively requires that there is a certain offset between the edge of the channel bandwidth of the first RAT and the edge of the channel bandwidth of the second RAT.

In some of these embodiments, for example, nominal emission limits are applicable for transmitting a radio signal according to the second RAT irrespective of whether the radio signal is transmitted in the guard band for the first RAT. Moreover, additional emission limits are applicable in addition to the nominal emission limits for transmitting a radio signal according to the second RAT in the guard band for the first RAT, depending on a frequency offset of the radio signal from the edge of the channel bandwidth for the first RAT. The additional emission limits may be enforced when the frequency offset is smaller than a defined threshold and may not be enforced when the frequency offset is greater than the defined threshold. This defined threshold may depend on a size of the channel bandwidth for the first RAT.

In fact, in some embodiments, a radio node herein transmits a radio signal according to the second RAT in compliance with nominal emission limits specified for the second RAT. The radio node transmits the radio signal selectively in compliance with additional emission limits when transmitting the radio signal in a guard band of the first RAT. That is, the radio node transmits the radio signal without regard to the additional emission limits when transmitted outside of the guard band of the first RAT, but transmits the radio signal in compliance with those additional emission limits when transmitted in the guard band. The additional emission limits may therefore be referred to as guard band specific emission limits. In some embodiments, the additional emission limits specify emission limits based on a channel bandwidth of the first RAT and/or a frequency offset of the radio signal from an edge of the first RAT's channel bandwidth, e.g., so as to limit emissions differently depending on the channel bandwidth and frequency offset. The emission limits here may limit out of band emissions, in band emissions, and/or adjacent channel leakage (e.g., in terms of ACLR, etc.).

Consider the following examples of the above embodiments, where reference to RAT1 concerns the first RAT above and reference to RAT2 concerns the second RAT above. The signal in RAT1 should meet certain emission requirements for outside of the channel bandwidth. However a UE or a network node that is in RAT2 heretofore meets the emission requirements of RAT2 alone. When RAT2 operates in the guard-band of RAT1, the network node and/or the UE in RAT2 needs to meet both requirements.

Figure 9A:
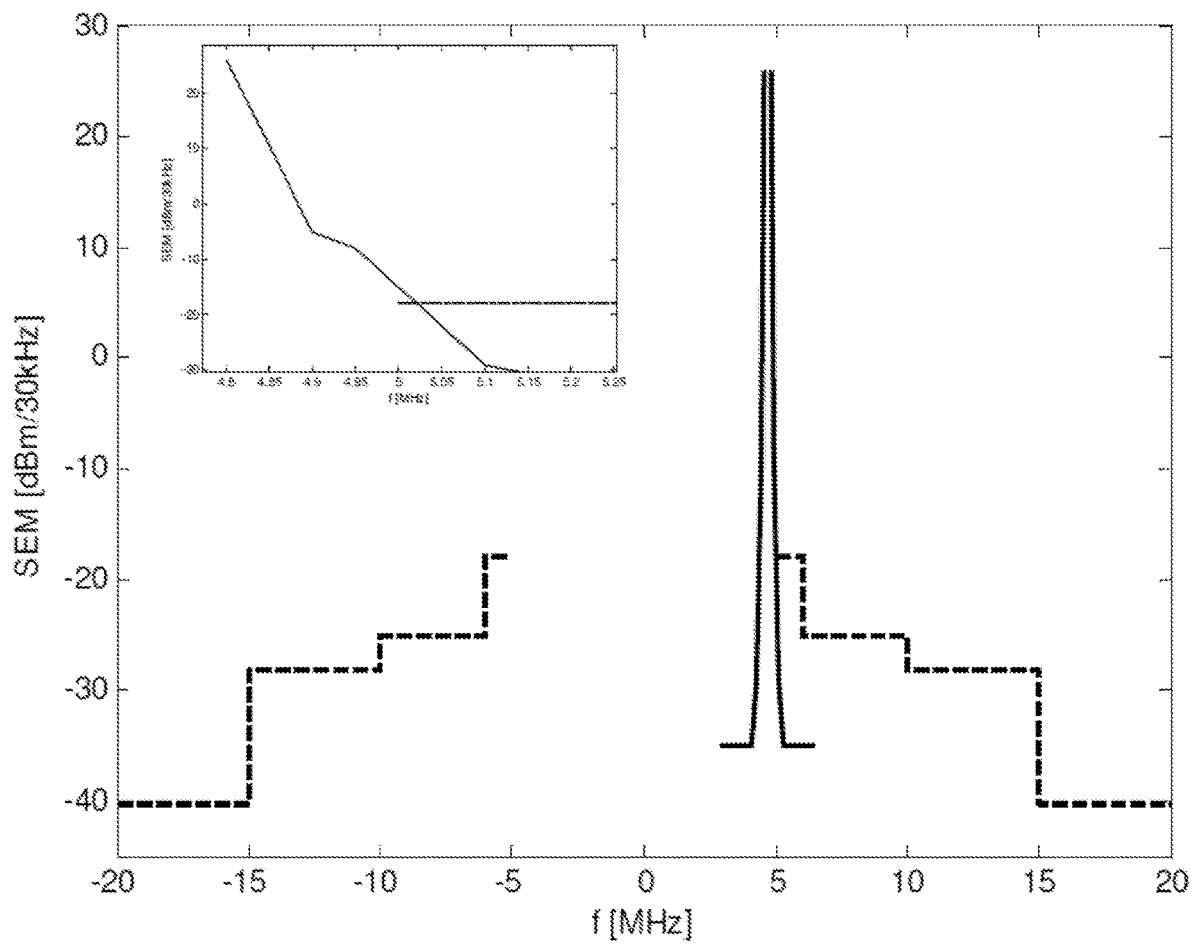
FIG. 9A is a graph illustrating overlap between the spectral emission masks of NB-IoT and LTE according to some embodiments.

FIG. 9A shows as an example a NB-IoT emission mask that is placed in the guard band of a 10 MHz LTE, where LTE and NB-IoT in this case are the first and second RATs respectively. The emission mark of NB-IoT is represented by a solid line and the emission mask of the 10 MHz LTE is represented by dotted lines. As it is shown in the small box in FIG. 9A, the emission mask of the NB-IoT crosses over the emission mask of LTE.

In order to guarantee that the signal level of the radio node (e.g., UE or base station BS) in RAT2, including its in-band and out-of-band emission requirements, meets the requirements of RAT1, some embodiments herein specify certain restrictions on the operating carrier of the RAT2 or the emission requirements of RAT2 in the guard-band. The embodiments may for instance determine an absolute frequency or channel number, indicate it, and adapt the RAT2 carrier frequency to it. The steps of these embodiments can be done at a network node or a UE node or in a collaboration between the two nodes. Regardless, the embodiments ensure that the radio node (e.g. UE or BS) operating in RAT2 within the guard band of RAT1 does not cause emissions more than the emissions caused by another node (e.g. UE or BS) operating in RAT1. According to this aspect, when a RAT2 operates inside the channel bandwidth of a RAT1, the carrier frequency or channel number of a RAT2 is determined such that the spectrum emission mask of RAT2 and/or the signal level in RAT2 remains within the limit of the spectrum mask of RAT1.

With respect to the NB-IoT and LTE example, in order to guarantee that the NB-IoT in the guard-band of LTE also meets LTE emission requirements, some embodiments require that NB-IoT in the guardband of LTE has a certain offset from the LTE band-edge. Specifically, when operating in the guardband, in addition to the spectrum emission requirements in FIG. 6, a category NB1 UE should meet the additional requirements in the table shown in FIG. 9B, regarding the offset frequency from the edge of the LTE channel bandwidth. This table specifies additional requirements for category NB1 UE spectrum emission mask.

Figure 10:
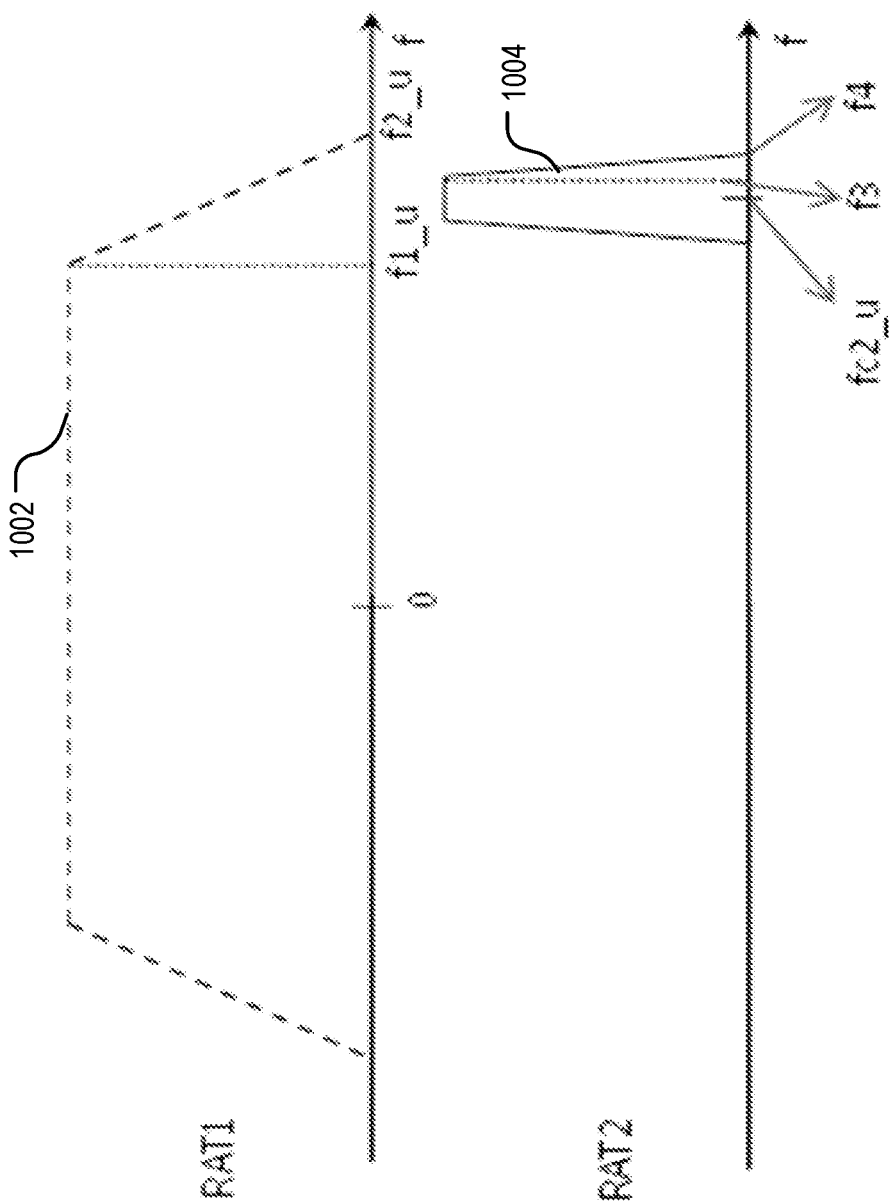
FIG. 10 is a block diagram of spectral emission masks for first and second RATs according to some embodiments.

Another exemplary rule in these embodiments is illustrated in FIG. 10. As shown, the channel bandwidth 1002 of the first RAT has an upper channel edge frequency f2_u defining the upper edge of the channel bandwidth 1002. Within the channel bandwidth 1002, the guard band is defined between the upper channel edge frequency f1_u and the upper transmission edge frequency f2_u defining the edge of the channel bandwidth 1002. FIG. 10 also shows the channel bandwidth 904 of the second RAT as having an upper channel edge frequency f4 defining an edge of the channel bandwidth 1004, with a guard band defined between that upper channel edge frequency f4 and an upper transmission edge frequency f3. The carrier (i.e., center) frequency of the second RAT is shown as fc2_u. Notably, FIG. 10 shows that in some embodiments the carrier frequency in the second RAT is determined such that f4<f2_u; that is, such that the edge of the channel bandwidth of the second RAT is offset from the edge of the channel bandwidth of the first RAT. This requires that the center frequency of RAT2 is less than the upper channel edge frequency f2_u. The center frequency of operation is typically denoted by a frequency channel number such as EARFCN.

Figure 11:
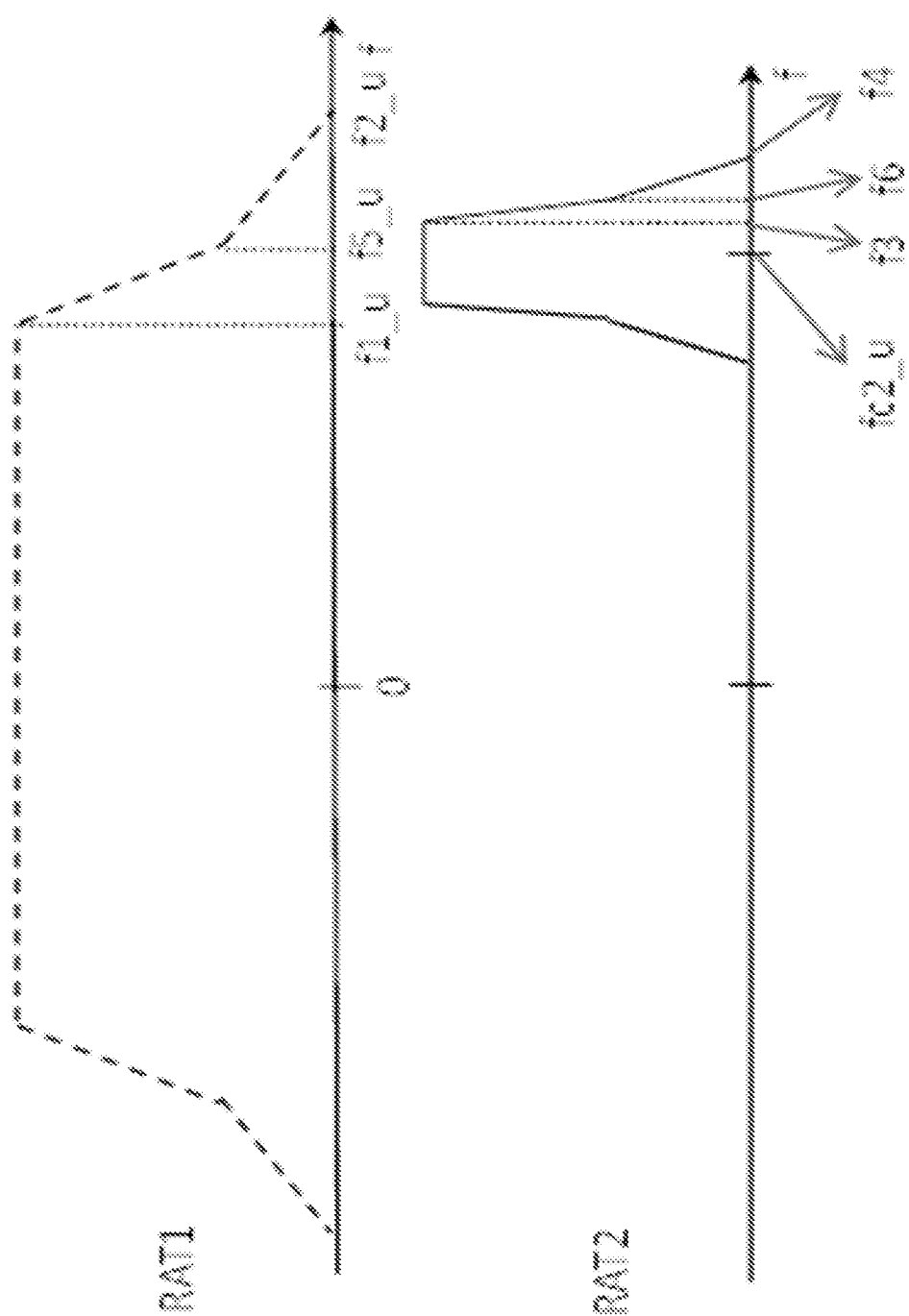
FIG. 11 is a block diagram of spectral emission masks for first and second RATs according to other embodiments.

The exemplary frequencies f2_u and f4 in the above constraint in some embodiments are different breaking points in a spectrum emission mask, in which case the most stringent one applies. This is shown in FIG. 11, where the most stringent requirement in this example is f6<f5_u.

Note that the constraint in the above examples (e.g., on the frequency position of the radio signal of the second RAT) can be represented as a rule relative to any of a number of possible frequency location references. In one example, the rule constrains the central frequency of RAT2 with respect to the channel bandwidth of RAT1, the transmission bandwidth configuration of RAT1, etc.

According to one example of such rule, a frequency (fc2) for RAT2 operation of a node in a guard band of RAT1 can be expressed by the following general expression:

$$fc2 = g1(f1, \Delta f) \quad (3)$$

where f1 is the frequency of the edge of transmission BW of RAT1 and $\Delta f$ is the offset from the edge of the transmission bandwidth (f1).

The value of $\Delta f$ is chosen in some embodiments such that the emission mask of the node (e.g. UE or BS) operating in RAT2 with center frequency fc2 does not exceed the limits of emission mask of node (e.g. UE or BS) operating in RAT1. The emission mask is defined as power level at different frequencies outside the transmission bandwidth of the node. The emission mask of RAT2 is considered to be within the limit of the emission mask of RAT1 provided that the power level of RAT2 emission mask at any given frequency (fg) is not larger than the power level of RAT1 emission mask at the same frequency (i.e., fg). The value of $\Delta f$ depends on the channel bandwidths of RAT1 and RAT2. Assuming RAT2 has a fixed channel BW of 200 KHz (i.e. if RAT2 is NB-IoT), the values of would be defined for different channel BWs of RAT1 (e.g. 1.4, 3, 5, 10, 15 and 20 MHz for LTE).

Typically fc2 is the center frequency of the RAT2 operation. It can be expressed in terms of channel number e.g. EARFCN.

The RAT2 can be operated in the guard band occurring above the transmission BW (f1_u) of RAT1 or in the guard band below the transmission BW (f1_l) of RAT1. Assume that fc2_u and fc2_l denote the frequencies of the RAT2 operation in the guard band above f1_u and in the guard band below f1_l respectively. The expression (3) can be extended for the two operations in upper and lower guard bands as follows:

$$fc2\_u = g2(f1\_u, \Delta f) \quad (4)$$

$$fc2\_l = g3(f1\_l, \Delta f) \quad (5)$$

The uplink and downlink center frequencies for RAT2 operations in upper guard band of RAT1 are expressed by fc2_u_ul and fc2_u_dl and are determined by using the following expressions:

$$fc2\_u\_ul = g4(f1\_u\_ul, \Delta f1) \quad (6)$$

$$fc2\_u\_dl = g5(f1\_u\_dl, \Delta f2) \quad (7)$$

where $\Delta f1$ and $\Delta f2$ are the frequency offsets for UL and DL respectively. They can be the same (i.e. $\Delta f1 = \Delta f2 = \Delta f$) or can be different.

The uplink and downlink center frequencies for RAT2 operations in lower guard band of RAT1 are expressed by fc2_l_ul and fc2_l_dl and are determined by using the following expressions:

$$fc2\_l\_ul = g6(f1\_l\_ul, \Delta f1) \quad (8)$$

$$fc2\_l\_dl = g7(f1\_l\_dl, \Delta f2) \quad (9)$$

As a particular example the rule defining fc2 for RAT2 operation in the upper guard band of RAT1 can be expressed by the following expression:

$$fc2\_u < f1\_u + \Delta f \quad (10)$$

As an example the rule defining fc2 for RAT2 operation in the lower guard band of RAT1 can be expressed by the following expression:

$$fc2\_l > f1\_l - \Delta f \quad (11)$$

As a particular example the uplink and downlink center frequencies for RAT2 operations in upper guard band of RAT1 (fc2_$u$_ul and fc2_$u$_dl) are determined by using the following expressions:

$$fc2\_u\_ul < f1\_u\_ul + \Delta f1 \quad (12)$$

$$fc2\_u\_dl < f1\_u\_dl + \Delta f2 \quad (13)$$

Also as a particular example the uplink and downlink center frequencies for RAT2 operations in lower guard band of RAT1 (f2$c$_l_ul and fc2_$l$_dl) are determined by using the following expressions:

$$fc2\_l\_ul > f1\_l\_ul - \Delta f1 \quad (14)$$

$$fc2\_l\_dl > f1\_l\_dl - \Delta f2 \quad (15)$$

The above descriptions apply to both UE and the network node, so there are restrictions on both downlink and uplink frequencies for RAT2. If RAT2 has flexible TX-RX frequency separation, then the two restrictions are independent from one another. The flexible TX-RX frequency separation is also called as variable TX-RX frequency separation or variable TX-RX frequency spacing.

According to other embodiments, the absolute channel number or offset to the channel raster may be determined, indicated, and adapted. That is, in some embodiments, the rule for determining the position of RAT2 in terms of frequency of operation inside the guard-band of RAT1 is specified in the form of E-UTRA Absolute Radio Frequency Channel Number (EARFCN) and/or the offset to the channel raster.

Examples of such rules can be a certain constraint on $N_{DL}/M_{DL}$ and/or on $N_{UL}/M_{UL}$. When RAT2 has a fixed TX-RX frequency spacing then the two restrictions on the UL and DL frequencies of RAT2 are not independent from each other. In case of fixed TX-RX spacing the center frequencies of the UL carrier and DL carrier are separated by a fixed frequency offset or separation regardless of the values of UL and DL carrier frequencies. The fixed TX-RX spacing is also interchangeably called as fixed TX-RX carrier frequency separation, TX-RX frequency separation, fixed TX-RX duplex, fixed TX-RX duplex spacing etc.

According to one aspect for a RAT2 with fixed TX-RX frequency separation, the center frequency fc2 in the UL and/or in DL of RAT2 operation is adjusted to ensure that the fixed TX-RX frequency separation is maintained.

In one example the uplink and downlink center frequencies for RAT2 operations in upper guard band of RAT1 (f2$c$_u_ul and fc2_$u$_dl) are adjusted to fc2_$u$_ul' and fc2_$ul$_dl' to achieve fixed TX-RX separation and are determined by using the following expressions:

$$fc2\_u\_ul' < f1\_u\_ul + \Delta f1' \quad (16)$$

$$fc2\_u\_dl' < f1\_u\_dl + \Delta f2' \quad (17)$$

where difference between fc2_$u$_ul' and fc2_$ul$_dl' is always a fixed (i.e. the same value) for all sets of UL and DL center frequencies.

In another example the uplink and downlink center frequencies for RAT2 operations in lower guard band of RAT1 (f2$c$_l_ul and fc2_$l$_dl) are adjusted to fc2_$l$_ul' and fc2_$l$_dl' to achieve fixed TX-RX separation and are determined by using the following expressions:

$$fc2\_l\_ul' < f1\_l\_ul + \Delta f1' \quad (18)$$

$$fc2\_l\_dl' < f1\_l\_dl + \Delta f2' \quad (19)$$

In yet another example only one of the uplink and downlink center frequencies for RAT2 operations in upper guard band of RAT1 (f2$c$_u_ul and fc2_$u$_dl) is adjusted (e.g. fc2_$u$_ul') to achieve fixed TX-RX separation and are determined by using the following expressions:

$$fc2\_u\_ul' < f1\_u\_ul + \Delta f1' \quad (20)$$

$$fc2\_u\_dl < f1\_u\_dl + \Delta f2 \quad (21)$$

In yet another example only one of the uplink and downlink center frequencies for RAT2 operations in lower guard band of RAT1 (f2$c$_l_ul and fc2_$l$_dl) is adjusted (e.g. fc2_$l$_ul') to achieve fixed TX-RX separation and are determined by using the following expressions:

$$fc2\_l\_ul' < f1\_l\_ul + \Delta f1' \quad (22)$$

$$fc2\_l\_dl < f1\_l\_dl + \Delta f2 \quad (23)$$

Yet other embodiments concern determining additional emission requirements for operation of RAT2 when operating inside the channel bandwidth of RAT 1. According to these embodiments, additional emission requirements are enforced when RAT2 is within the guard band of RAT1 and is within a certain distance from the RAT1 channel edge. To avoid RAT2 emissions violating the spectrum mask of RAT1, additional emission requirement can be applied for RAT2 when it operates in the guard band of RAT1.

In an exemplary embodiment, the additional emission requirement depends on the frequency of the operation or bandwidth of RAT2. The additional emission mask in this case becomes tighter for certain frequencies closer to the channel edge of RAT1 while it is more relaxed or does not exist when RAT2 has a larger margin to the edge of the RAT1 channel. In this case one or several threshold frequencies can be defined and corresponding to each threshold there is a certain emission masks apply.

Figure 12:
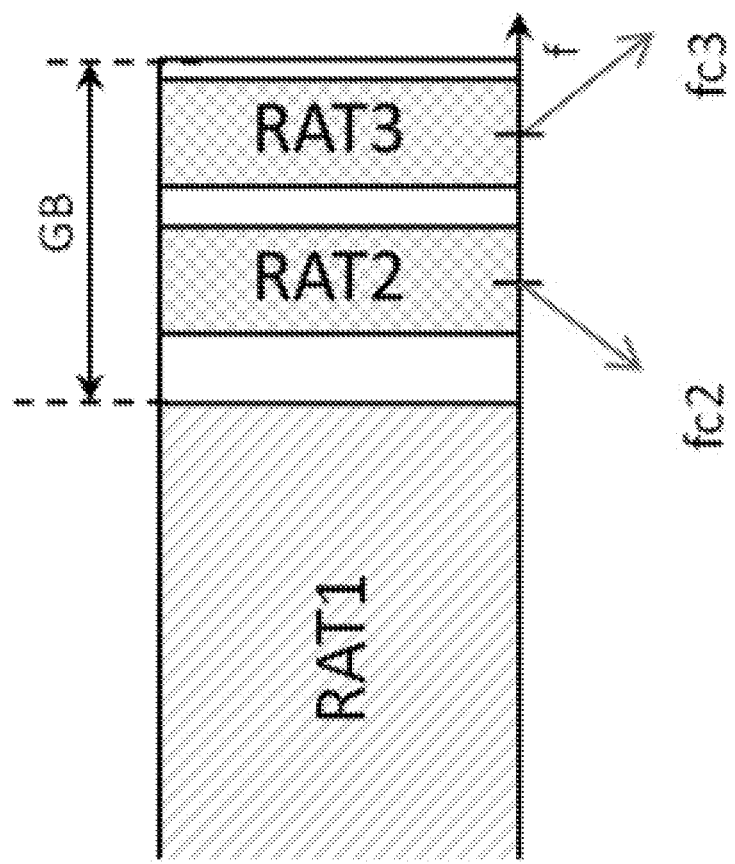
FIG. 12 is a block diagram of different RATs in the guardband of RAT1 according to some embodiments.

As an example, FIG. 12 shows a RAT2 that is operating in the guard band of RAT1 at center frequency fc2 and a RAT3 that operates at fc3. In this case, besides the corresponding spectrum emission mask (SEM) for RAT2 and RAT3, according to this method, additional spectrum emission masks apply to RAT2 and RAT3 which depend on their frequency of operation, $$SEM2 = g18(fc2)$$

$$SEM3 = g19(fc3)$$

where g18( ) and g19( ) are different spectrum emission masks and SEM3 is tighter than SEM2.

In view of the above, a NB-IoT network node or UE should meet the regulatory emission requirements as well as standard emission requirements as specified by 3GPP. However the signaling that determines UL and DL carrier frequency according to equations (1) and (2), only specifies the center carrier frequency for NB-IoT and does not guarantee that the emission requirements are met. There are emission requirements for both NB-IoT UE and NB-IoT BS, but when operating in the guard-band of LTE, they not only should meet the NB-IoT emission requirements, but also they should meet emission requirement of the hosting LTE system.

One or more embodiments herein include methods to determine requirements for a RAT2 (e.g. NB-IoT) operating in the guard-band of RAT1 (e.g. LTE) such that node operating RAT2 meets the general requirement of the RAT1 system. The method is implemented in a UE and a network node:

The method in a network node operating RAT2 within a guard band of RAT1, comprising the steps of: (i) determining an uplink carrier frequency (fc2_ul) for operating RAT2 within a guard band of RAT1, wherein fc2_ul is a function of at least a frequency (f1_ul) defining the edge of transmission bandwidth of RAT1 (BW1) and a frequency offset parameter (Δf1) wrt f1_ul, wherein the function is chosen to ensure that RAT2 operation at fc2_ul follows the radio emission requirement of RAT1; and (ii) configuring the UE with the information related to the determined value of fc2_ul.

The method in a network node operating RAT2 within a guard band of RAT1, comprises the steps of: (i) determining a downlink carrier frequency (fc2_dl) for operating RAT2 within a guard band of RAT1, wherein fc2_dl is a function of at least a frequency (f1_dl) defining the edge of transmission bandwidth of RAT1 (BW1) and a frequency offset parameter (Δf2) wrt f1_dl, wherein the function is chosen to ensure that RAT2 operation at fc2_dl follows the radio emission requirement of RAT1; and (ii) configuring the network node with the determined value of fc2_dl.

Moreover, a method in a UE for operating RAT2 within a guard band of RAT1 may comprise the steps of: (i) receiving information about an uplink carrier frequency (fc2_ul) for operating RAT2 within a guard band of RAT1; (ii) deriving fc2_ul based on received information; (iii) determining whether the derived value of fc2_ul is a function of at least a frequency (f1_ul) defining the edge of transmission bandwidth of RAT1 (BW1) and a frequency offset parameter (Δf1) wrt f1_ul, wherein the function is chosen to ensure that RAT2 operation at fc2_ul follows the radio emission requirement of RAT1; and (iv) configuring the UE with the received value of fc2_ul provided that the RAT2 operation at fc2_ul will enable the UE to meet emission requirement of RAT1, otherwise not configuring the UE with the received value of fc2_ul.

One or more embodiments herein may guarantee that RAT2 BS and UE operating inside the bandwidth of RAT1 do not violate emission requirements of RAT1. In some embodiments, the RAT2 performance is enhanced when it operates within the guard band of RAT1. In one or more embodiments, the interference towards the systems operating in carrier frequencies adjacent to the carrier frequency of RAT1 is reduced or avoided. Additionally or alternatively, the regulatory requirements in terms of radio emissions are met by UE and BS when operating in the guard band of another RAT.

Embodiments herein also generally include the method shown in FIG. 13 for configuring a radio node to transmit, within a guard band for a first radio access technology (RAT), a radio signal according to a second RAT. As shown, the method comprises determining one or more transmit parameters for transmission of the radio signal according to the second RAT, to comply with an emission limit governing transmission of the radio signal at a particular frequency offset from an edge of a channel bandwidth of the first RAT (Block 1302). The method further comprises configuring the radio node with the one or more transmit parameters for transmitting the radio signal within the guard band of the first RAT (Block 1304).

Embodiments herein further include the method shown in FIG. 14 for configuring a radio node to transmit, within a guard band for a first radio access technology (RAT), a radio signal according to a second RAT. The method comprises determining a carrier frequency on which the radio signal is to be transmitted according to the second RAT, to be within a defined frequency offset from an edge of a transmission bandwidth of the first RAT (Block 1402). The method also comprises configuring the radio node with the carrier frequency for transmitting the radio signal within the guard band of the first RAT (Block 1404).

Note that a configuring node may perform any of the above processing. The configuring node may be the radio node itself, a radio node to which the radio signal is to be transmitted, or some other node. Regardless, the configuring node as described herein may perform any of the processing herein by implementing any functional means or units. In one embodiment, for example, the configuring node comprises respective circuits or circuitry configured to perform the steps shown in FIGS. 8, 13, and/or 14. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 15:
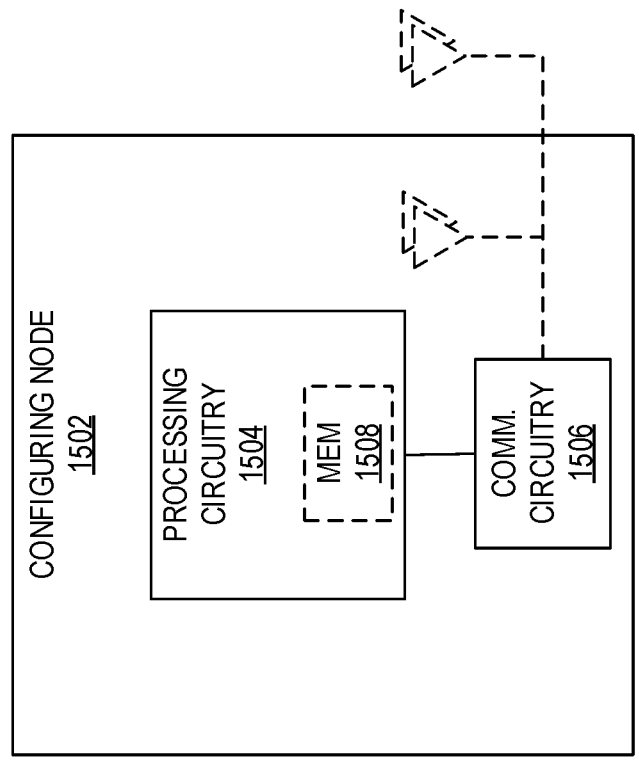
FIG. 15 is a block diagram of a configuring node according to some embodiments.

FIG. 15 illustrates a configuring node 1502 in accordance with one or more embodiments. As shown, the configuring node 1502 includes processing circuitry 1504 and communication circuitry 1506. The communication circuitry 1506 is configured to transmit and/or receive information to and/or from one or more other nodes, e.g., via any communication technology. In some embodiments, the configuring node 1502 is a radio node, in which case such communication may occur via one or more antennas that are either internal or external to the configuring node 1502. The processing circuitry 1504 is configured to perform processing described above, e.g., in FIGS. 8, 13, and/or 14, such as by executing instructions stored in memory. The processing circuitry 1502 in this regard may implement certain functional means, units, or modules.

Figure 16:
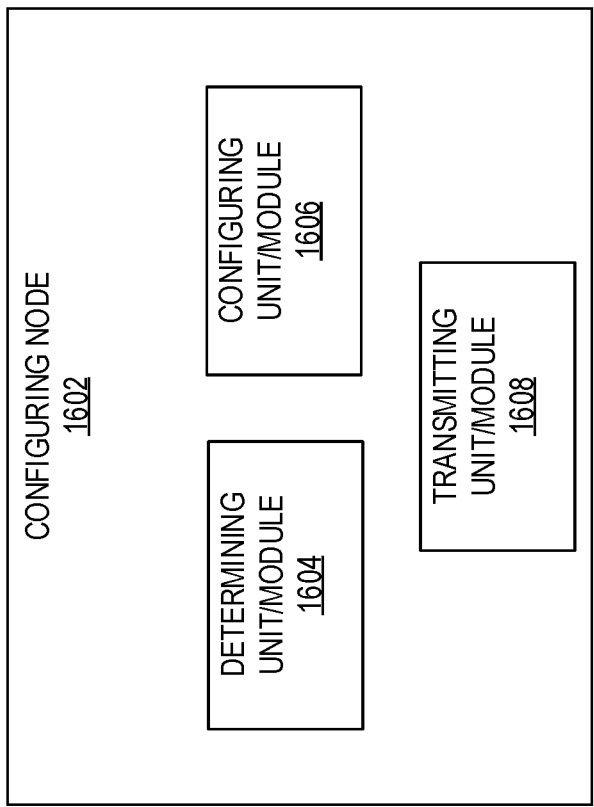
FIG. 16 is a block diagram of a configuring node according to other embodiments.

FIG. 16 illustrates a configuring node 1602 implemented in accordance with one or more other embodiments. As shown, the configuring node 1602 implements various functional means, units, or modules, e.g., via the processing circuitry 1504 in FIG. 15 and/or via software code. These functional means, units, or modules, e.g., for implementing the method in FIGS. 8, 13, and/or 14 include a determining module 1604 and a configuring module 1606 for implementing the determining and configuring steps respectively in FIGS. 8, 13, and/or 14. In some embodiments, e.g., such as where the configuring node 1602 is the radio node itself, a transmitting module 1608 may be included for transmitting the radio signal.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

In view of the above, embodiments generally include a method for configuring a radio node to transmit, within a guard band for a first radio access technology (RAT), a radio signal according to a second RAT. The method comprises determining one or more transmit parameters for transmission of the radio signal according to the second RAT, to comply with emission limits for both the first and second RATs; and configuring the radio node with the one or more transmit parameters for transmitting the radio signal within the guard band of the first RAT.

In some embodiments, the one or more transmit parameters comprise a frequency position of the radio signal within the guard band for the first RAT.

Alternatively or additionally, the one or more transmit parameters comprise a carrier frequency on which the radio signal is to be transmitted.

In some embodiments, said determining comprises determining a carrier frequency on which the radio signal is to be transmitted according to the second RAT, based on an edge frequency defining an edge of a transmission bandwidth of the first RAT and a defined frequency offset with respect to that edge frequency.

In some embodiments, said determining comprises determining a carrier frequency on which the radio signal is to be transmitted according to the second RAT, to be within a defined frequency offset from an edge of a transmission bandwidth of the first RAT.

In some embodiments, the method further comprises determining the defined frequency offset based on a channel bandwidth of the first RAT, with defined frequency offsets defined for different possible channel bandwidths of the first RAT.

In some embodiments, the defined frequency offset is specified based on emission requirements for the first RAT.

In some embodiments, the one or more transmit parameters comprise an Absolute Radio Frequency Channel Number and/or an offset to a channel raster.

In some embodiments, wherein the one or more transmit parameters comprise a signal level of the radio signal.

In some embodiments, said determining comprises determining the one or more transmit parameters based on a transmission bandwidth of the first RAT and/or a channel bandwidth of the first RAT.

In some embodiments, said determining comprises determining the one or more transmit parameters such that a spectral emission mask governing transmission of the radio signal according to the second RAT and/or a signal level of the radio signal is within a spectral emission mask governing the first RAT.

In some embodiments, the emission limits for the second RAT are specified to ensure compliance with the emission limits for the first RAT, and said determining comprises determining the one or more transmit parameters for transmission of the radio signal according to the second RAT to comply with the emission limits for the second RAT.

In some embodiments, the emission limits for the second RAT are specified as nominal emission limits applicable for transmitting a radio signal according to the second RAT irrespective of whether the radio signal is transmitted in the guard band for the first RAT and additional emission limits applicable in addition to the nominal emission limits for transmitting a radio signal according to the second RAT in the guard band for the first RAT.

In some embodiments, the additional emission limits depend on a frequency or bandwidth of the radio signal.

In some embodiments, the additional emission limits depend on a frequency offset of the radio signal from an edge of a channel bandwidth for the first RAT, with a tighter emission limits specified for a smaller frequency offset than a larger frequency offset.

Other embodiments herein include a method for configuring a radio node to transmit, within a guard band of a first radio access technology (RAT), a radio signal according to a second RAT. the method comprises determining one or more transmit parameters for transmission of the radio signal according to the second RAT, to comply with an emission limit governing transmission of the radio signal at a particular frequency offset from an edge of a channel bandwidth of the first RAT; and configuring the radio node with the one or more transmit parameters for transmitting the radio signal within the guard band of the first RAT.

In some embodiments, the emission limit is one of multiple different emission limits governing transmissions at different possible frequency offsets from an edge of the channel bandwidth of the first RAT.

In some embodiments, the one or more transmit parameters comprise a signal level of the radio signal.

In some embodiments, said determining comprises determining the one or more transmit parameters such that a spectral emission mask governing transmission of the radio signal according to the second RAT and/or a signal level of the radio signal is within a spectral emission mask governing the first RAT.

In some embodiments, emission limits for the second RAT are specified to ensure compliance with emission limits for the first RAT, and said determining comprises determining the one or more transmit parameters for transmission of the radio signal according to the second RAT to comply with the emission limits for the second RAT.

In some embodiments, emission limits for the second RAT are specified as nominal emission limits applicable for transmitting a radio signal according to the second RAT irrespective of whether the radio signal is transmitted in the guard band for the first RAT and additional emission limits applicable in addition to the nominal emission limits for transmitting a radio signal according to the second RAT in the guard band for the first RAT.

In some embodiments, the additional emission limits depend on a frequency or bandwidth of the radio signal.

In some embodiments, the additional emission limits depend on a frequency offset of the radio signal from an edge of a channel bandwidth for the first RAT, with a tighter emission limits specified for a smaller frequency offset than a larger frequency offset.

Embodiments also include a method for configuring a radio node to transmit, within a guard band for transmission according to a first radio access technology (RAT), a radio signal according to a second RAT. The method comprises determining a carrier frequency on which the radio signal is to be transmitted according to the second RAT, to be within a defined frequency offset from an edge of a transmission bandwidth of the first RAT; and configuring the radio node with the carrier frequency for transmitting the radio signal within the guard band of the first RAT.

In some embodiments, the method further comprises determining the defined frequency offset based on a channel bandwidth of the first RAT, with defined frequency offsets defined for different possible channel bandwidths of the first RAT.

In some embodiments, the defined frequency offset is specified based on emission requirements for the first RAT.

In some embodiments, the method is implemented by the radio node, and further comprises transmitting the radio signal as configured with the one or more transmit parameters.

In some embodiments, the method is implemented by a base station, wherein the radio signal is to be transmitted to or from the base station.

In some embodiments, the radio node is a user equipment.

Embodiments also include a configuring node for configuring a radio node to transmit, within a guard band for a first radio access technology (RAT), a radio signal according to a second RAT. The configuring node is configured to determine one or more transmit parameters for transmission of the radio signal according to the second RAT, to comply with emission limits for both the first and second RATs; and configure the radio node with the one or more transmit parameters for transmitting the radio signal within the guard band of the first RAT.

In some embodiments, the configuring node is configured to perform the method of any of the above embodiments.

Embodiments further include a configuring node for configuring a radio node to transmit, within a guard band of a first radio access technology (RAT), a radio signal according to a second RAT. The configuring node is configured to: determine one or more transmit parameters for transmission of the radio signal according to the second RAT, to comply with an emission limit governing transmission of the radio signal at a particular frequency offset from an edge of a channel bandwidth of the first RAT; and configure the radio node with the one or more transmit parameters for transmitting the radio signal within the guard band of the first RAT.

In some embodiments, the configuring node is configured to perform the method of any of the above embodiments.

Embodiments further include a configuring node for configuring a radio node to transmit, within a guard band for transmission according to a first radio access technology (RAT), a radio signal according to a second RAT. The configuring node is configured to: determine a carrier frequency on which the radio signal is to be transmitted according to the second RAT, to be within a defined frequency offset from an edge of a transmission bandwidth of the first RAT; and configure the radio node with the carrier frequency for transmitting the radio signal within the guard band of the first RAT.

In some embodiments, the configuring node is configured to perform the method of any of the above embodiments.

Embodiments further include a configuring node for configuring a radio node to transmit, within a guard band for a first radio access technology (RAT), a radio signal according to a second RAT. The configuring node comprises a determining module for determining one or more transmit parameters for transmission of the radio signal according to the second RAT, to comply with emission limits for both the first and second RATs; and a configuring module for configuring the radio node with the one or more transmit parameters for transmitting the radio signal within the guard band of the first RAT.

In some embodiments, the configuring node is configured to perform the method of any of the above embodiments.

Embodiments further include a configuring node for configuring a radio node to transmit, within a guard band of a first radio access technology (RAT), a radio signal according to a second RAT. The configuring node comprises a determining module for determining one or more transmit parameters for transmission of the radio signal according to the second RAT, to comply with an emission limit governing transmission of the radio signal at a particular frequency offset from an edge of a channel bandwidth of the first RAT; and a configuring module for configuring the radio node with the one or more transmit parameters for transmitting the radio signal within the guard band of the first RAT.

In some embodiments, the configuring node is configured to perform the method of any of the above embodiments.

Embodiments further include a configuring node for configuring a radio node to transmit, within a guard band for transmission according to a first radio access technology (RAT), a radio signal according to a second RAT. The configuring node comprises a determining module for determining a carrier frequency on which the radio signal is to be transmitted according to the second RAT, to be within a defined frequency offset from an edge of a transmission bandwidth of the first RAT; and a configuring module for configuring the radio node with the carrier frequency for transmitting the radio signal within the guard band of the first RAT.

In some embodiments, the configuring node is configured to perform the method of any of the above embodiments.

Embodiments further include a configuring node for configuring a radio node to transmit, within a guard band for a first radio access technology (RAT), a radio signal according to a second RAT. The configuring node comprises a processor and a memory, the memory containing instructions executable by the processor whereby the configuring node is configured to: determine one or more transmit parameters for transmission of the radio signal according to the second RAT, to comply with emission limits for both the first and second RATs; and configure the radio node with the one or more transmit parameters for transmitting the radio signal within the guard band of the first RAT.

The memory may contain instructions executable by the processor whereby the configuring node is configured to perform the method of any of the above embodiments.

Embodiments further include a configuring node for configuring a radio node to transmit, within a guard band of a first radio access technology (RAT), a radio signal according to a second RAT. The configuring node comprises a processor and a memory, the memory containing instructions executable by the processor whereby the configuring node is configured to: determine one or more transmit parameters for transmission of the radio signal according to the second RAT, to comply with an emission limit governing transmission of the radio signal at a particular frequency offset from an edge of a channel bandwidth of the first RAT; and configure the radio node with the one or more transmit parameters for transmitting the radio signal within the guard band of the first RAT.

The memory may contain instructions executable by the processor whereby the configuring node is configured to perform the method of any of the above embodiments.

Embodiments also include a configuring node for configuring a radio node to transmit, within a guard band for transmission according to a first radio access technology (RAT), a radio signal according to a second RAT. The configuring node comprises a processor and a memory, the memory containing instructions executable by the processor whereby the configuring node is configured to: determine a carrier frequency on which the radio signal is to be transmitted according to the second RAT, to be within a defined frequency offset from an edge of a transmission bandwidth of the first RAT; and configure the radio node with the carrier frequency for transmitting the radio signal within the guard band of the first RAT.

The memory may contain instructions executable by the processor whereby the configuring node is configured to perform the method of any of the above embodiments.

Embodiments also include a computer program, comprising instructions which, when executed on at least one processor of a configuring node, cause the at least one processor to carry out the method according to any of the above embodiments.

Embodiments further include a carrier containing the computer program. The carrier is one of an electronic signal, optical signal, radio signal, or computer readable storage medium.

Embodiments herein also include methods to adapt transmission parameters of an NB-IoT node when operating in the guard band of an E-UTRA carrier to ensure that the NB-IoT node meets emission requirements of E-UTRA. The methods apply to both network node and the UE node. To enable the NB-IoT node to meet emission requirements of E-UTRA, the adaptation can be done on one or more transmission parameters used by the NB-IoT node for transmitting signals. Examples of the transmission parameters are the power of the NB-IoT signal, maximum power of NB-IoT signal, frequency allocation of the NB-IoT subcarriers, transport format (e.g. MCS that is used in the carriers, number of data or transport blocks in a data channel, size of data or transport block etc.), etc.

In a first embodiment, a method in a node comprises the steps of: (i) determining whether RAT2 operates in the guard band (GB) of RAT1, wherein the GB is the range of frequencies between the channel BW and the transmission BW of RAT1; (ii) if RAT2 operates in the guard band of RAT1 then adapting or restricts one or more parameters related to transmission of signals in RAT2 to ensure that RAT2 meets emission requirements of RAT1 or at least RAT2 emission does not exceed the limit of emissions of RAT1; and (iii) transmit signals in RAT2 based on adapted or restricted set of transmission parameters.

In a second embodiment, a method in node comprises the steps of: (i) determining whether RAT2 operates in the guard band of RAT2, wherein the GB is the range of frequencies between the channel BW and the transmission BW of RAT1; (ii) determining an offset ($\Delta f$) of a center frequency (fc2) of RAT2 from the edge of the transmission bandwidth of RAT1; (iii) If RAT2 operates in the guard band of RAT1 and magnitude of $\Delta f$ is below a threshold (H) then adapting or restricting one or more parameters related to transmission of signals in RAT2; (iv) If RAT2 operates in the guard band of RAT1 and magnitude of $\Delta f$ is larger than H then not adapting or restricting one or more parameters related to transmission of signals in RAT2; (v) Transmit signals in RAT2 based on adapted or unadapted set of transmission parameters.

In a third embodiment a method in a node comprises the steps of: (i) Determining whether RAT2 operates in the guard band of RAT2, wherein the GB is the range of frequencies between the channel BW and the transmission BW of RAT1; (ii) Determining an offset ($\Delta f$) of a center frequency (fc2) of RAT2 from the edge of the transmission bandwidth of RAT1; (iii) If RAT2 operates in the guard band of RAT1 and magnitude of $\Delta f$ is below a threshold (H) then adapting or restricting one or more parameters related to transmission of signals in RAT2 to a first set of parameters to ensure that RAT2 meets emission requirements of RAT1 or at least RAT2 emission does not exceed the limit of emissions of RAT1; (iv) If RAT2 operates in the guard band of RAT1 and magnitude of $\Delta f$ is larger than H then adapting or restricting one or more parameters related to transmission of signals in RAT2 to a second set of parameters to ensure that RAT2 meets emission requirements of RAT1 or at least RAT2 emission does not exceed the limit of emissions of RAT1, wherein the first adapted set comprises of at least one more parameter more restricted than the corresponding parameter in the second adapt set; (vi) and Transmit signals in RAT2 based on the first or the second set of the adapted or restricted transmission parameters.

The methods outlined above provide that RAT2 BS and UE operating inside the bandwidth of RAT1 do not violate emission requirements of RAT1. The RAT2 performance is enhanced when it operates within the guard band of RAT1. In some embodiments, the interference towards the systems operating in carrier frequencies adjacent to the carrier frequency of RAT1 is reduced or avoided. In some embodiments, the regulatory requirements in terms of radio emissions are met by UE and BS when operating in the guard band of another RAT.

More particularly, a node performs certain steps or execute a procedure in order to ensure that when a node operates RAT2 in the guard band of the channel bandwidth of a RAT1, then the radio emission requirements of RAT2 remains within the limit of the radio emission requirements of RAT1.

An example of radio emission requirement is spectrum emission mask. In such a case, the values of one or more transmission parameters are chosen or adapted is such that the emission mask of the node (e.g. UE or BS) operating in RAT2 with center frequency fc2 in the guard band of RAT1 does not exceed the limits of emission mask of node (e.g. UE or BS) operating in RAT1. The emission mask is defined as power level at different frequencies outside the transmission BW of the node. The emission mask of RAT2 is considered to be within the limit of the emission mask of RAT1 provided that the power level of RAT2 emission mask at any given frequency (fg) is not larger than the power level of RAT1 emission mask at the same frequency.

Examples of transmission parameters are transmit power, average transmit power, maximum transmit power, transport format or data format of a transport channel, number of physical resources (e.g. resource blocks (RBs), subcarriers, resource elements etc.) etc. Parameters describing transport channel are number of transport blocks per transport channel, transport block size per transport block, modulation and coding scheme etc.

The reduction or adaptation in UL transport channel characteristics will also reduce UL RBs and UL transmit power on a carrier used by the node for transmitting signals of RAT2. This will in turn reduce emissions caused by RAT2 and based on the reduced set of transmission parameters, RAT2 emission requirements will remain within RAT1 emission requirements.

In one exemplary implementation the node may adapt or limit one or more transmission parameters of RAT2 provided that RAT2 is configured to operate anywhere within the guard band of RAT1 i.e. adapt RAT transmission parameters if RAT2 center frequency (fc2) is anywhere within the GB of RAT1. This rule can be pre-defined or it can be configured by another node or it can be autonomously selected by the node itself (e.g. whenever RAT2 does not meet emission requirements of RAT1).

In yet another exemplary implementation the node does not need to adapt or limit one or more transmission parameters of RAT2 provided that RAT2 is configured to operate within certain range of frequencies within the guard band of RAT1 i.e. adapt RAT transmission parameters only if RAT2 center frequency (fc2) is within certain ranges of carrier frequencies the GB of RAT1. This rule can also be pre-defined or it can be configured by another node or it can be autonomously selected by the node itself (e.g. whenever RAT2 does not meet emission requirements of RAT1). An example of certain ranges of frequencies are those frequencies (e.g. center frequency where RAT2 can operate) which are located at least certain offset ($\Delta f$) from the edge of the transmission bandwidth of RAT1. In other words of fc2 is far from the edge of RAT1 transmission BW then the RAT2 does not need to limit the value of any transmission parameters. The value of $\Delta f$ depends on the channel bandwidths of RAT1 and RAT2. Assuming RAT2 has a fixed channel BW of 200 KHz (i.e. if RAT2 is NB-IoT), the values of would be defined for different channel BWs of RAT1 (e.g. 1.4, 3, 5, 10, 15 and 20 MHz for LTE). The value of $\Delta f$ is chosen such that the emission mask of the node (e.g. UE or BS) operating in RAT2 with center frequency fc2 does not exceed the limits of emission mask of node (e.g. UE or BS) operating in RAT1.

In a first method, the node performs the following main steps: (i) Determining whether RAT2 operates in the guard band of RAT2; (ii) If RAT2 operates in the guard band of RAT1 then adapting or restricts one or more parameters related to transmission of signals in RAT2; and (iii) Transmit signals in RAT2 based on adapted or restricted set of transmission parameters.

In a second method the node performs the following main steps: (i) Determining whether RAT2 operates in the guard band of RAT2; (ii) Determining an offset ($\Delta f$) of a center frequency (fc2) of RAT2 from the edge of the transmission bandwidth of RAT1; (iii) If RAT2 operates in the guard band of RAT1 and magnitude of $\Delta f$ is below a threshold (H) then adapting or restricting one or more parameters related to transmission of signals in RAT2; (iv) If RAT2 operates in the guard band of RAT1 and magnitude of $\Delta f$ is larger than H then not adapting or restricting one or more parameters related to transmission of signals in RAT2;

Transmit signals in RAT2 based on adapted or unadapted set of transmission parameters.

In a third method the node performs the following main steps: (i) Determining whether RAT2 operates in the guard band of RAT2; (ii) Determining an offset ($\Delta f$) of a center frequency (fc2) of RAT2 from the edge of the transmission bandwidth of RAT1; (iii) If RAT2 operates in the guard band of RAT1 and magnitude of $\Delta f$ is below a threshold (H) then adapting or restricting one or more parameters related to transmission of signals in RAT2 to a first set of parameters; (iv) If RAT2 operates in the guard band of RAT1 and magnitude of $\Delta f$ is larger than H then adapting or restricting one or more parameters related to transmission of signals in RAT2 to a second set of parameters, wherein the first adapted set comprises of at least one more parameter more restricted than the corresponding parameter in the second adapt set; and (v) Transmit signals in RAT2 based on the first or the second set of the adapted or restricted transmission parameters.

Examples of first and second sets of adapted parameters are maximum transmit power of 17 dBm and 20 dBm respectively. Another example of first and second set of adapted parameters are modulation of BPSK and QPSK respectively. Yet another example of first and second set of adapted parameters are code rates of ⅓ and ½ respectively.

The adapted or limited or reduced set of transmission parameters may be pre-defined, configured by a network node or decided by the node itself.

In the following section various examples of adapting one or more transmission parameters for transmitting signals on RAT2 within RAT1 guard band are further elaborated with various examples.

According to this aspect of the disclosure, when a RAT2 operates inside the channel bandwidth of a RAT1, the maximum transmission power of RAT2 can be adapted such that the signal level of RAT2 remains within the limit of the spectrum mask of RAT1. Examples of adapting the transmission power of RAT2 can be a backoff in the transmission power of the network node, or applying maximum power reduction (MPR) or additional maximum power reduction (A-MPR). The value of MPR is expressed in dB. For example 2 dB reduction means reducing the max transmit power of the UE from 23 dBm to 21 dBm. The A-MPR defines the UE maximum output power reduction (on top of the normal MPR) needed to fulfill certain emission requirements by accounting for factors such as: bandwidth, frequency band or resource block allocation. To enable application of A-MPR, the network signaling (NS) parameter value is signaled to the UE via system information in a UE specific channel or in a broadcast message. This allows the UE to acquire this information when it camps on to a cell. The acquired NS value which is associated with a cell is then used by the UE to map to certain A-MPR and reduce its maximum output power whenever it transmits in the uplink.

Figure 17:
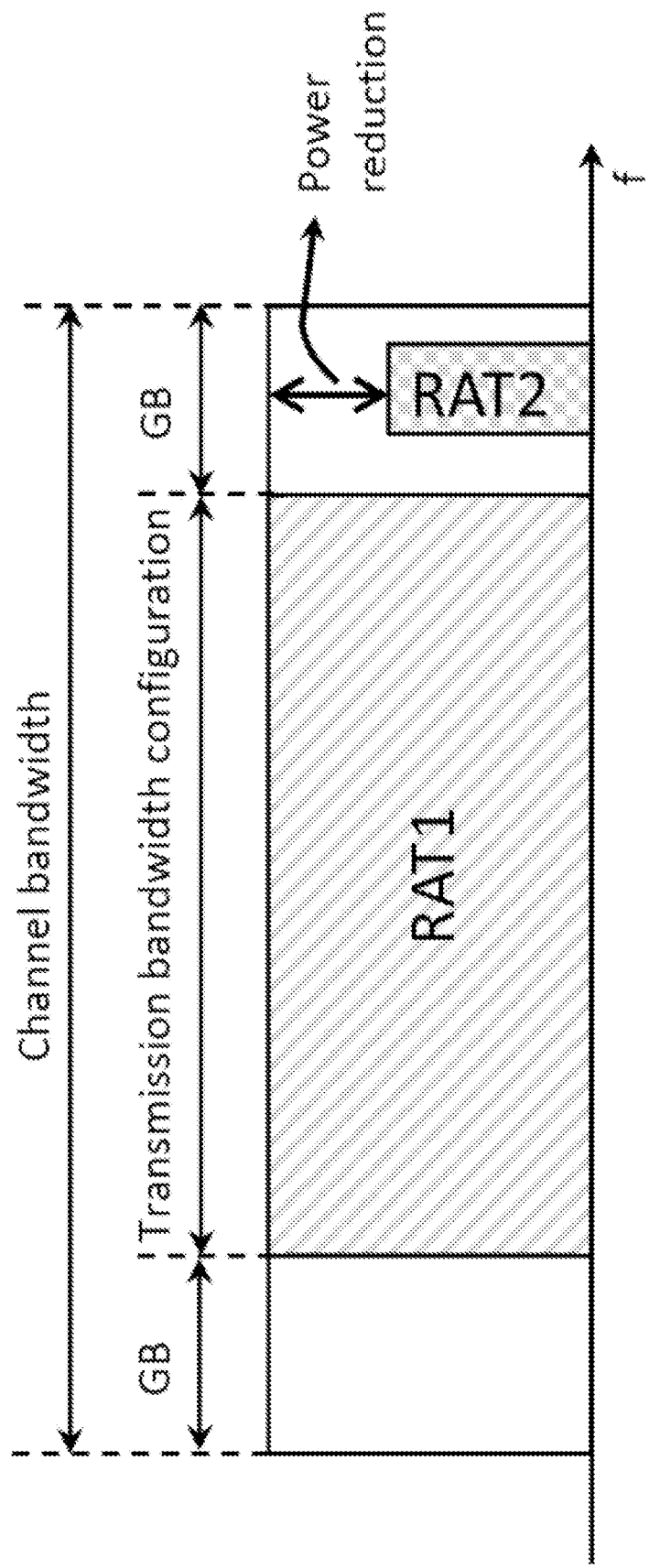
FIG. 17 is a block diagram of RAT2 power reduction in the guardband of RAT1 according to some embodiments.

In one exemplary embodiment, the power level of RAT2 can be a function of the frequency offset between the RAT2 and the edge of cannel bandwidth of RAT1. As an example if RAT2 has a large offset to the edge of the RAT1 channel bandwidth, then the maximum allowed power can be used for RAT2, i.e. zero power reduction can be used. While if RAT2 is close to the edge of the RAT1, a power reduction can be used that depends on the offset to the edge of the channel bandwidth of RAT1. FIG. 17 shows as an example a RAT2 that operates inside the guard-band of a RAT1, where RAT is has a reduced power in order to meet the emission requirements of RAT1.

According to this aspect of the disclosure, when a RAT2 operates inside the channel bandwidth of a RAT1, the allocation of subcarriers is adapted to the spectrum mask of RAT1 and/or the offset between RAT2 to RAT1 channel edge. The adaptation is done such that RAT2 data are transmitted on the subcarriers that are further away from the channel edge of RAT1, while subcarriers in RAT2 that are closer to the edge of the channel bandwidth of RAT1 are left empty.

According to this aspect of the disclosure, when a RAT2 operates inside the channel bandwidth of a RAT1, modulation and coding scheme (MCS) that is used for RAT2 is adapted to the spectrum mask of RAT1 and/or the offset between RAT2 to RAT1 channel edge. The adaptation is done such that MCS that if RAT2 is operating close to the edge of the channel bandwidth in RAT1, then MCS with less maximum power and/or less envelope variation is used. Example of modulation schemes with low envelope variation are pi/2 BPSK or pi/4QPSK, and examples of high envelope variation modulation are 16-QAM, 64QAM, etc.

Note that terminology such as base station, NodeB or eNode B and UE should be considering non-limiting and does in particular not imply a certain hierarchical relation between the two; in general "NodeB" could be considered as device 1 and "UE" device 2, and these two devices communicate with each other over some radio channel. A generic term network node is used in some embodiments. The network node can be a base station, access point, NodeB or eNode B etc. A generic term wireless device is used in some embodiments. The wireless device can be any type of UE such as D2D UE, MTC UE, M2M UE etc. The MTC or M2M UE may also be interchangeably called as, narrow band or narrow BW UE, category 0 UE, category M UE, low cost and/or low complexity UE etc. Yet another generic term, radio node, may be used in some embodiments. The radio node may be a network node or a wireless device.

The UE may operate under either normal coverage or enhanced coverage with respect to its serving cell. The enhanced coverage is also interchangeably called as extended coverage. The UE may also operate in a plurality of coverage levels (i.e. move within different coverage levels) e.g. normal coverage, enhanced coverage level 1, enhanced coverage level 2, enhanced coverage level 3 and so on.

In some embodiments a term operating bandwidth (BW) is used. Over the operating BW the network node transmits to and/or receives signal from one or more UEs in a cell. The operating bandwidth is interchangeably called as channel bandwidth, system bandwidth, transmission bandwidth, cell bandwidth, cell transmission BW, carrier bandwidth etc. The operating BW may be expressed in different units. Examples of units are KHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE etc.

Despite particular applicability to NB-IoT in some examples, it will be appreciated that the techniques may be applied to other wireless networks, including eMTC as well as to successors of the E-UTRAN. Thus, references herein to signals using terminology from the 3GPP standards for LTE should be understood to apply more generally to signals having similar characteristics and/or purposes, in other networks.

A radio node herein is any type of node (e.g., a base station or wireless communication device) capable of communicating with another node over radio signals. A radio network node is any type of radio node within a wireless communication network, such as a base station. A wireless communication device is any type of radio node capable of communicating with a radio network node over radio signals. A wireless communication device may therefore refer to a machine-to-machine (M2M) device, a machine-type communications (MTC) device, a NB-IoT device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Figure 18:
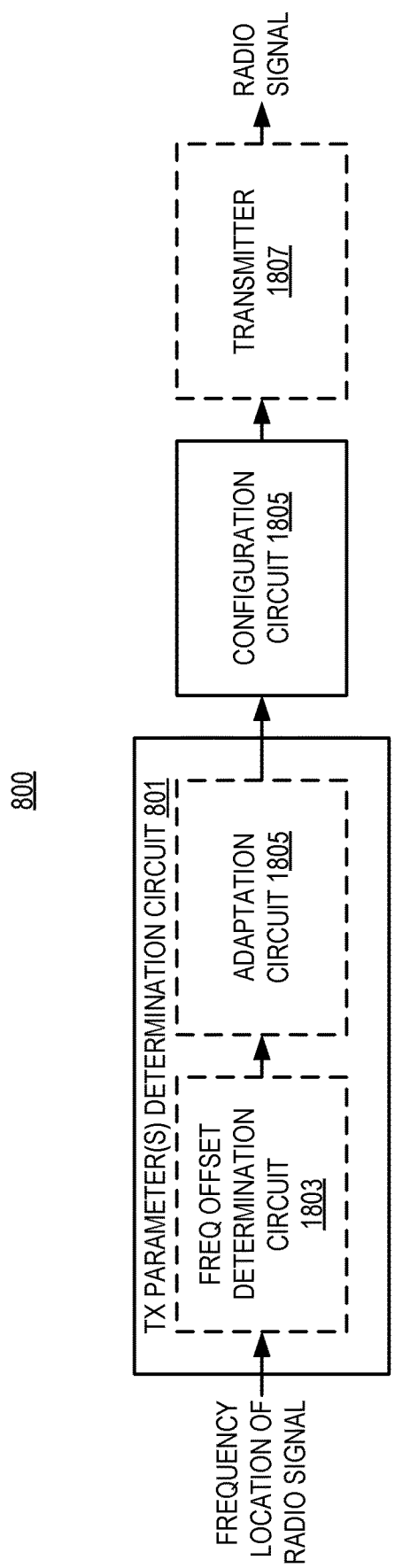
FIG. 18 illustrates one embodiment of a configuring node for configuring transmission in a guard band of a radio access technology in accordance with various aspects as described herein.

FIG. 18 illustrates one embodiment of a configuring node for configuring transmission in a guard band of a radio access technology in accordance with various aspects as described herein.

Figure 19:
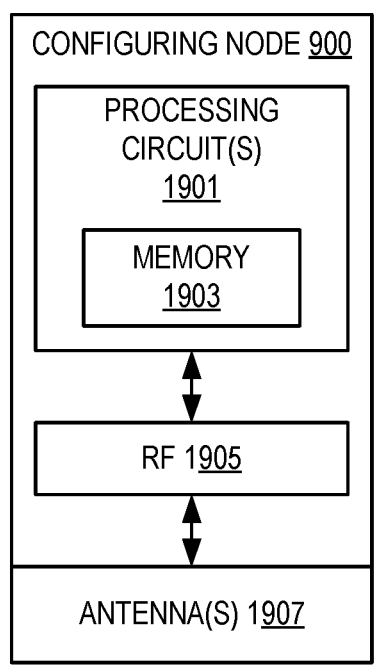
FIG. 19 illustrates another embodiment of a configuring node for configuring transmission in a guard band of a radio access technology in accordance with various aspects as described herein.

FIG. 19 illustrates another embodiment of a configuring node for configuring transmission in a guard band of a radio access technology in accordance with various aspects as described herein.

Figure 20:
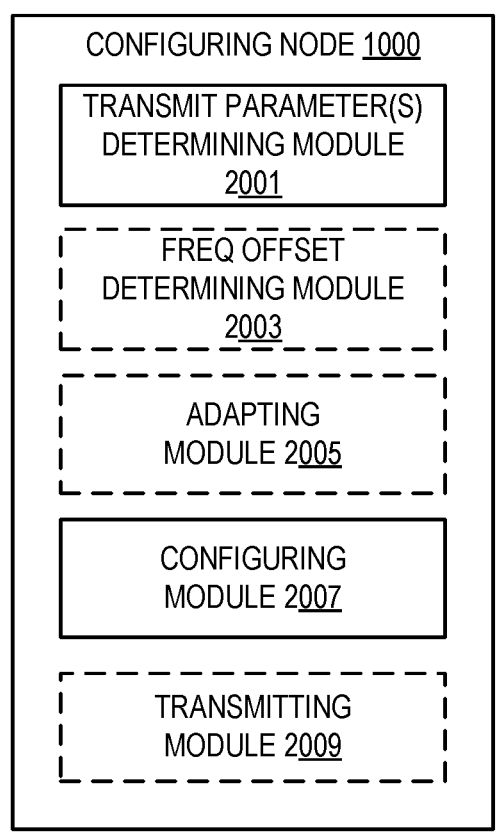
FIG. 20 illustrates another embodiment of a configuring node for configuring transmission in a guard band of a radio access technology in accordance with various aspects as described herein.

FIG. 20 illustrates another embodiment of a configuring node for configuring transmission in a guard band of a radio access technology in accordance with various aspects as described herein.

Of course, despite particular applicability to NB-IoT in some examples, it will be appreciated that the techniques may be applied to other wireless networks, including eMTC as well as to successors of the E-UTRAN. Thus, references herein to signals using terminology from the 3GPP standards for LTE should be understood to apply more generally to signals having similar characteristics and/or purposes, in other networks.

Figure 21:
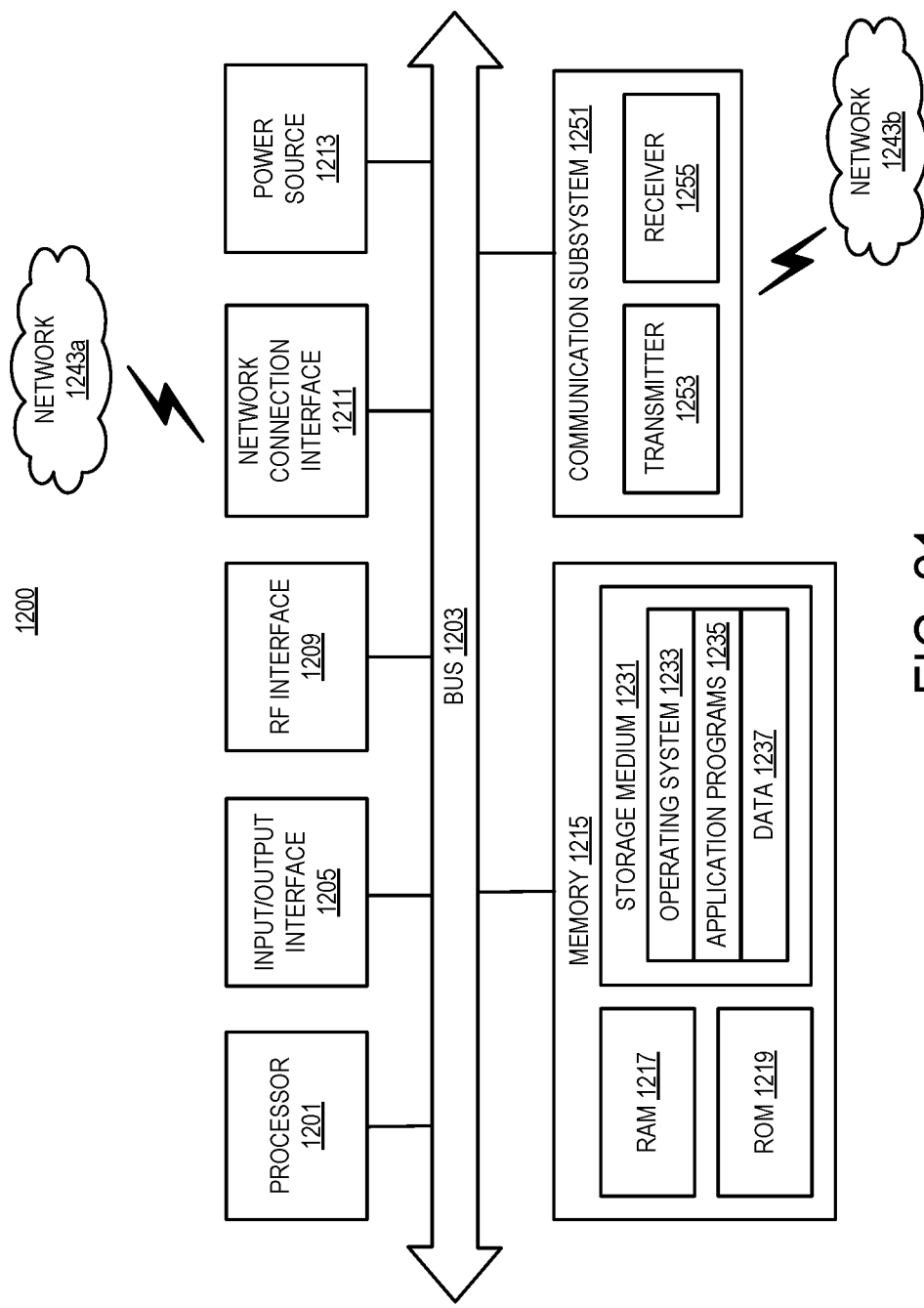
FIG. 21 illustrates another embodiment of a configuring node for configuring transmission in a guard band of a radio access technology in accordance with various aspects as described herein.

FIG. 21 illustrates another embodiment of a configuring node 1200 in accordance with various aspects as described herein. In some instances, the configuring node 1200 may be referred as wireless device, a radio node, a network node, a base station (BS), an access point (AP), a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the configuring node 1200 may be a set of hardware components. In FIG. 21, the configuring node 1200 may be configured to include a processor 1201 that is operatively coupled to an input/output interface 1205, a radio frequency (RF) interface 1209, a network connection interface 1211, a memory 1215 including a random access memory (RAM) 1217, a read only memory (ROM) 1219, a storage medium 1221 or the like, a communication subsystem 1251, a power source 1233, another component, or any combination thereof. The storage medium 1221 may include an operating system 1223, an application program 1225, data 1227, or the like. Specific devices may utilize all of the components shown in FIG. 21, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 21, the processor 1201 may be configured to process computer instructions and data. The processor 1201 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1201 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1205 may be configured to provide a communication interface to an input device, output device, or input and output device. The configuring node 1200 may be configured to use an output device via the input/output interface 1205. A person of ordinary skill will recognize that an output device may use the same type of interface port as an input device. For example, a USB port may be used to provide input to and output from the configuring node 1200. The output device may be a speaker, a sound card, a video card, a display, a monitor, a printer, an actuator, an emitter, a smartcard, another output device, or any combination thereof. The configuring node 1200 may be configured to use an input device via the input/output interface 1205 to allow a user to capture information into the configuring node 1200. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, the RF interface 1209 may be configured to provide a communication interface to RF components such as a transmitter, a receiver, and an antenna. The network connection interface 1211 may be configured to provide a communication interface to a network 1243a. The network 1243a may encompass wired and wireless communication networks such as a local-area network (LAN), a wide-area network (WAN), a computer network, a wireless network, a telecommunications network, another like network or any combination thereof. For example, the network 1243a may be a Wi-Fi network. The network connection interface 1211 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1211 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 1217 may be configured to interface via the bus 1202 to the processor 1201 to provide storage or caching of data or computer instructions during the execution of software programs such as the operating system, application programs, and device drivers. In one example, the configuring node 1200 may include at least one hundred and twenty-eight megabytes (128 Mbytes) of RAM. The ROM 1219 may be configured to provide computer instructions or data to the processor 1201. For example, the ROM 1219 may be configured to be invariant low-level system code or data for basic system functions such as basic input and output (I/O), startup, or reception of keystrokes from a keyboard that are stored in a non-volatile memory. The storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1221 may be configured to include an operating system 1223, an application program 1225 such as a web browser application, a widget or gadget engine or another application, and a data file 1227.

In FIG. 21, the processor 1201 may be configured to communicate with a network 1243b using the communication subsystem 1251. The network 1243a and the network 1243b may be the same network or networks or different network or networks. The communication subsystem 1251 may be configured to include one or more transceivers used to communicate with the network 1243b. The one or more transceivers may be used to communicate with one or more remote transceivers of another configuring node such as a base station of a radio access network (RAN) according to one or more communication protocols known in the art or that may be developed, such as IEEE 1102.xx, CDMA, WCDMA, GSM, LTE, UTRAN, WiMax, NB-IoT, or the like.

In another example, the communication subsystem 1251 may be configured to include one or more transceivers used to communicate with one or more remote transceivers of another configuring node such as user equipment according to one or more communication protocols known in the art or that may be developed, such as IEEE 1102.xx, CDMA, WCDMA, GSM, LTE, UTRAN, WiMax, NB-IoT, or the like. Each transceiver may include a transmitter 1253 or a receiver 1255 to implement transmitter or receiver functionality, respectively, appropriate to the RAN links (e.g., frequency allocations and the like). Further, the transmitter 1253 and the receiver 1255 of each transceiver may share circuit components, software or firmware, or alternatively may be implemented separately.

In the current embodiment, the communication functions of the communication subsystem 1251 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1251 may include cellular communication, Wi-Fi communication, Bluetooth communication, and GPS communication. The network 1243b may encompass wired and wireless communication networks such as a local-area network (LAN), a wide-area network (WAN), a computer network, a wireless network, a telecommunications network, another like network or any combination thereof. For example, the network 1243b may be a cellular network, a Wi-Fi network, and a near-field network. The power source 1213 may be configured to provide an alternating current (AC) or direct current (DC) power to components of the configuring node 1200.

In FIG. 21, the storage medium 1221 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1221 may allow the configuring node 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a computer-readable medium.

The functionality of the methods described herein may be implemented in one of the components of the configuring node 1200 or partitioned across multiple components of the configuring node 1200. Further, the functionality of the methods described herein may be implemented in any combination of hardware, software or firmware. In one example, the communication subsystem 1251 may be configured to include any of the components described herein. Further, the processor 1201 may be configured to communicate with any of such components over the bus 1202. In another example, any of such components may be represented by program instructions stored in memory that when executed by the processor 1201 performs the corresponding functions described herein. In another example, the functionality of any of such components may be partitioned between the processor 1201 and the communication subsystem 1251. In another example, the non-computative-intensive functions of any of such components may be implemented in software or firmware and the computative-intensive functions may be implemented in hardware.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

In view of the above, embodiments herein generally include a method for configuring a radio node to transmit, within a guard band for a first radio access technology (RAT), a radio signal according to a second RAT. The method comprises determining one or more transmit parameters for transmission of the radio signal according to the second RAT, to comply with emission limits for the first RAT; and configuring the radio node with the one or more transmit parameters for transmitting the radio signal within the guard band of the first RAT.

In some embodiments, said determining is responsive to determining that the radio signal is to be transmitted within the guard band for the first RAT.

In some embodiments, said determining the one or more transmit parameters comprises adapting, to comply with emission limits for the first RAT, the one or more transmit parameters for transmission of the radio signal according to the second RAT.

In some embodiments, said determining the one or more transmit parameters comprises adapting one or more rules according to which the one or more transmit parameters are to be determined, to comply with emission limits for the first RAT.

In some embodiments, said adapting comprises adapting the one or more rules responsive to determining that one or more conditions are met indicating that the adapting is needed for compliance with emission limits for the first RAT.

In some embodiments, said determining is performed responsive to determining that one or more conditions are met indicating that compliance with emission limits for the first RAT is required.

In some embodiments, the one or more conditions include that the radio signal is to be transmitted within the guard band for the first RAT.

In some embodiments, the one or more conditions include that the radio signal is to be transmitted within a certain frequency region within the guard band for the first RAT.

In some embodiments, the frequency region is a region beyond a defined frequency offset from an edge of a transmission bandwidth for the first RAT.

In some embodiments, the frequency region is a region within a defined frequency offset from an edge of a channel bandwidth for the first RAT.

In some embodiments, the one or more rules impose restrictions on values of the one or more transmit parameters, to comply with the emission limits for the first RAT.

In some embodiments, said determining is based on a frequency location of the radio signal within the guard band of the first RAT In some embodiments, said determining is based on a frequency offset between a carrier frequency of the radio signal within the guard band of the first RAT and an edge frequency defining an edge of a transmission bandwidth of the first RAT.

In some embodiments, said determining the one or more transmit parameters comprises: determining a frequency offset between a carrier frequency of the radio signal within the guard band of the first RAT and an edge frequency defining an edge of a transmission bandwidth of the first RAT; and adapting, based on the frequency offset and to comply with emission limits for the first RAT, the one or more transmit parameters for transmission of the radio signal according to the second RAT.

In some embodiments, said determining the one or more transmit parameters comprises determining whether to adapt one or more rules according to the one or more transmit parameters.

In some embodiments, said determining whether to adapt the transmit parameters includes: when the frequency offset is less than a predetermined threshold, determining not to perform the step of said adapting; and when the frequency offset is at least the predetermined threshold, determining to perform the step of said adapting.

In some embodiments, said determining whether to adapt the transmit parameters includes: when the frequency offset is less than a predetermined threshold, determining to perform the step of said adapting; and when the frequency offset is at least the predetermined threshold, determining not to perform the step of said adapting.

In some embodiments, said adapting includes: when the frequency offset is less than a predetermined threshold, adapting the transmit parameters to a first set of transmit parameters; and when the frequency offset is at least the predetermined threshold, adapting the transmit parameters to a second set of transmit parameters.

In some embodiments, one of the first and second set is more restrictive than the other set on the compliance with emission limits for the first RAT for the transmission of the radio signal according to the second RAT.

In some embodiments, said adapting includes restricting, to comply with emission limits for the first RAT, one or more transmit parameters for transmission of the radio signal according to the second RAT.

In some embodiments, said determining comprises determining the one or more transmit parameters according to a first set of one or more constraints in order to comply with emission limits for the first RAT, responsive to determining that the radio signal is to be transmitted within the guard band for the first RAT, wherein the first set of one or more constraints is different than a second set of one or more constraints according to which the radio node is configured to determine the one or more transmit parameters for transmission of the radio signal outside the guard band for the first RAT.

In some embodiments, said determining the one or more transmit parameters also complies with emission limits for the second RAT.

In some embodiments, the one or more transmit parameters include a frequency position of the radio signal within the guard band for the first RAT.

In some embodiments, the one or more transmit parameters include a carrier frequency on which the radio signal is to be transmitted.

In some embodiments, the one or more transmit parameters include a signal level of the radio signal.

In some embodiments, the one or more transmit parameters include a maximum signal level of the radio signal.

In some embodiments, the one or more transmit parameters include a frequency allocation of subcarriers for the second RAT.

In some embodiments, the one or more transmit parameters include a transport format for the radio signal.

In some embodiments, the transport format includes at least one of a modulation scheme, a coding scheme and a transport block size.

In some embodiments, said determining the transmit parameters includes determining a carrier frequency on which the radio signal is to be transmitted according to the second RAT, based on an edge frequency defining an edge of a transmission bandwidth of the first RAT and a defined frequency offset with respect to that edge frequency.

In some embodiments, said determining the transmit parameters includes determining a carrier frequency on which the radio signal is to be transmitted according to the second RAT, to be within a defined frequency offset from an edge frequency defining an edge of a transmission bandwidth of the first RAT.

In some embodiments, the method further comprises determining the defined frequency offset based on a channel bandwidth of the first RAT, with defined frequency offsets defined for different possible channel bandwidths of the first RAT.

In some embodiments, the defined frequency offset is specified based on emission requirements for the first RAT.

In some embodiments, the transmit parameters include at least one of an Absolute Radio Frequency Channel Number (ARFCN) and an offset to a channel raster.

In some embodiments, said determining the transmit parameters includes determining the transmit parameters based on at least one of a transmission bandwidth of the first RAT and a channel bandwidth of the first RAT.

In some embodiments, said determining the transmit parameters includes determining the transmit parameters so that at least one of a spectral emission mask governing transmission of the radio signal according to the second RAT and a signal level of the radio signal is within a spectral emission mask governing the first RAT.

In some embodiments, the emission limits for the second RAT are specified to ensure compliance with the emission limits for the first RAT, and wherein said determining the transmit parameters includes determining the transmit parameters for transmission of the radio signal according to the second RAT to comply with the emission limits for the second RAT.

In some embodiments, the emission limits for the second RAT are specified as nominal emission limits applicable for transmitting a radio signal according to the second RAT irrespective of whether the radio signal is transmitted in the guard band for the first RAT and additional emission limits applicable in addition to the nominal emission limits for transmitting a radio signal according to the second RAT in the guard band for the first RAT.

In some embodiments, the additional emission limits depend on at least one of a frequency and bandwidth of the radio signal.

In some embodiments, the additional emission limits depend on a frequency offset of the radio signal from an edge frequency defining an edge of a channel bandwidth of the first RAT, with a tighter emission limits specified for a smaller frequency offset than a larger frequency offset.

In some embodiments, the method further comprises transmitting the radio signal, according to the second RAT, within the guard band of the first RAT, in compliance with the emission limits for the first RAT, based on the one or more transmit parameters.

Embodiments also include a configuring node for configuring a radio node to transmit, within a guard band for a first radio access technology (RAT), a radio signal according to a second RAT. The configuring node is configured to: determine one or more transmit parameters for transmission of the radio signal according to the second RAT, to comply with emission limits for the first RAT; and configure the radio node with the one or more transmit parameters for transmitting the radio signal within the guard band of the first RAT.

In some embodiments, the configured node is configured to perform the method of any of the above embodiments.

Embodiments also include a configuring node for configuring a radio node to transmit, within a guard band of a first radio access technology (RAT), a radio signal according to a second RAT. The configuring node comprises: a transmit parameter determination circuit configured to determine one or more transmit parameters for transmission of the radio signal according to the second RAT, to comply with emission limits for the first RAT; and a configuration circuit configured to configure the radio node with the one or more transmit parameters for transmitting the radio signal within the guard band of the first RAT.

In some embodiments, the determination circuit includes: a frequency offset determination circuit configured to determine a frequency offset between a frequency location of the radio signal within the guard band of the first RAT and an edge frequency defining an edge of a transmission bandwidth of the first RAT; and an adaptation circuit configured to adapt, to comply with emission limits for the first RAT, one or more transmit parameters for transmission of the radio signal according to the second RAT based on the frequency offset.

In some embodiments, the configuring node is further configured to configure a transmitter configured to transmit the radio signal, according to the second RAT, within the guard band of the first RAT, in compliance with the emission limits for the first RAT, based on the one or more transmit parameters.

In some embodiments, the configuring node is configured to perform the method of any of the above embodiments.

In some embodiments, a configuring node for configuring a radio node to transmit, within a guard band of a first radio access technology (RAT), a radio signal according to a second RAT. The configuring node comprises a transmit parameter determination module for determining one or more transmit parameters for transmission of the radio signal according to the second RAT, to comply with emission limits for the first RAT; and a configuration module for configuring the radio node with the one or more transmit parameters for transmitting the radio signal within the guard band of the first RAT.

In some embodiments, the determination circuit includes: a frequency offset determination module for determining a frequency offset between a frequency location of the radio signal within the guard band of the first RAT and an edge frequency defining an edge of a transmission bandwidth of the first RAT; and an adaptation module for adapting, to comply with emission limits for the first RAT, one or more transmit parameters for transmission of the radio signal according to the second RAT based on the frequency offset.

In some embodiments, the configuring node further comprises a transmission module configured to transmit the radio signal, according to the second RAT, within the guard band of the first RAT, in compliance with the emission limits for the first RAT, based on the one or more transmit parameters.

In some embodiments, the configured node is configured to perform the method of any of the above.

Other embodiments include a configuring node for configuring a radio node to transmit, within a guard band for a first radio access technology (RAT), a radio signal according to a second RAT. The configuring node comprises a processor and a memory, the memory containing instructions executable by the processor whereby the configuring node is configured to: determine one or more transmit parameters for transmission of the radio signal according to the second RAT, to comply with emission limits for the first RAT; and configure the radio node with the one or more transmit parameters for transmitting the radio signal within the guard band of the first RAT.

In some embodiments, the memory contains instructions executable by the processor whereby the configuring node is configured to perform the method of any of the above embodiments.

Embodiments further include a computer program, comprising instructions which, when executed on at least one processor of a configuring node, cause the at least one processor to carry out the method according to any of the embodiments.

Embodiments further include a carrier containing the computer program, wherein the carrier is one of an electronic signal, optical signal, radio signal, or computer readable storage medium.

What is claimed is:

1. A method for configuring a radio node to transmit, within a guard band of a first radio access technology, RAT, a radio signal according to a second RAT, the method comprising:
configuring the radio node to transmit the radio signal according to the second RAT within the guard band of the first RAT, wherein the transmission is based on a channel bandwidth of the first RAT and emission limits for the first RAT.

2. The method of claim 1 wherein configuring the radio node to transmit the radio signal according to the second RAT within the guard band of the first RAT comprises configuring one or more transmit parameters for transmitting the radio signal.

3. The method of claim 2, wherein:
the one or more transmit parameters include a carrier frequency on which the radio signal is to be transmitted according to the second RAT; and
the carrier frequency is determined based on an edge frequency defining an edge of the channel bandwidth of the first RAT and a defined frequency offset with respect to the edge frequency.

4. The method of claim 3, further comprising determining the defined frequency offset based on the channel bandwidth of the first RAT, with defined frequency offsets defined for different possible channel bandwidths of the first RAT.

5. The method of claim 3, wherein the defined frequency offset is specified based on emission requirements for the first RAT.

6. The method of claim 2, wherein:
the one or more transmit parameters include the frequency position of the radio signal; and
the frequency position is determined such that a spectral emission mask governing transmission of the radio signal according to the second RAT is within a spectral emission mask governing the first RAT.

7. The method of claim 2:
wherein a spectrum emission mask for the second RAT applies to frequencies starting from an edge of a channel bandwidth of the second RAT; and
wherein the determining comprises determining the frequency position based on requirements specified for the spectrum emission mask for the second RAT regarding an offset frequency from an edge of the channel bandwidth of the first RAT.

8. The method of claim 7, wherein the offset frequency depends on a size of the channel bandwidth of the first RAT.

9. The method of claim 7, wherein:
the one or more transmit parameters include a carrier frequency on which the radio signal is to be transmitted according to the second RAT; and
the frequency position is determined based on a table that specifies respective offset frequencies required for different possible sizes of the channel bandwidth of the first RAT.

10. The method of claim 2, wherein:
the one or more transmit parameters include a carrier frequency on which the radio signal is to be transmitted according to the second RAT; and
the frequency position is determined based a requirement of at least a certain frequency offset between an edge of the channel bandwidth of the first RAT and an edge of a channel bandwidth of the second RAT.

11. The method of claim 10, wherein the certain frequency offset required depends on a size of the channel bandwidth of the first RAT.

12. The method of claim 2, wherein the determining comprises determining the frequency position based on a requirement regarding an offset frequency from an edge of the channel bandwidth of the first RAT.

13. The method of claim 2, wherein the determining comprises determining the one or more transmit parameters for transmission of the radio signal to comply with emission limits for both the first and second RATs.

14. The method of claim 1, wherein:
nominal emission limits are applicable for transmitting a radio signal according to the second RAT irrespective of whether the radio signal is transmitted in the guard band for the first RAT;
additional emission limits are applicable in addition to the nominal emission limits for transmitting a radio signal according to the second RAT in the guard band for the first RAT, depending on a frequency offset of the radio signal from an edge of a channel bandwidth for the first RAT; and
wherein the additional emission limits are enforced when the frequency offset is smaller than a defined threshold and are not enforced when the frequency offset is greater than the defined threshold.

15. The method of claim 14, wherein the defined threshold depends on a size of the channel bandwidth for the first RAT.

16. The method of claim 1 wherein:
the method is performed by a base station; and
the method further comprises transmitting the one or more transmit parameters to the radio node.

17. The method of claim 1 wherein:
the method is performed by a user equipment; and
the method further comprises transmitting the radio signal as configured with the one or more transmit parameters.

18. A radio node for transmitting, within a guard band for a first radio access technology (RAT), a radio signal according to a second RAT, the radio node comprising:
processing circuitry for determining one or more transmit parameters for transmitting the radio signal according to the second RAT within the guard band of the first RAT, wherein the transmission is based on a channel bandwidth of the first RAT and emission limits for the first RAT,
radio circuitry for transmitting the radio signal or the one or more transmit parameters to a second radio node.

19. The radio node of claim 18 wherein the radio node comprises a base station configured to transmit the transmit parameters to user equipment.

20. The radio node of claim 18 wherein the radio node comprises a user equipment configured to transmit the radio signal.

\* \* \* \* \*

UNITED STATES PATENT AND TRADEMARK OFFICE
CERTIFICATE OF CORRECTION

PATENT NO. : 10,992,434 B2  
APPLICATION NO. : 16/792038  
DATED : April 27, 2021  
INVENTOR(S) : Behravan et al.

It is certified that error appears in the above-identified patent and that said Letters Patent is hereby corrected as shown below:

In the Specification

In Column 1, Line 7, delete "2018," and insert -- 2018, now U.S. Pat. No. 10,587,376, --, therefor.

In Column 1, Line 56, delete "$N_u$s" and insert -- $N_{UL}$ --, therefor.

In Column 2, Line 53, delete "'1n-band" and insert -- 'In-band --, therefor.

In Column 11, Line 7, delete "emission mark" and insert -- emission mask --, therefor.

In Column 28, Line 48, delete "NB-loT," and insert -- NB-IoT, --, therefor.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*